United States Patent

Kluge

[15] 3,699,545

[45] Oct. 17, 1972

[54] ADAPTABLE ASSOCIATIVE MEMORY SYSTEM

[72] Inventor: Werner Erich Kluge, Kanaia, Ontario, Canada

[73] Assignee: Northern Electric Company Limited, Montreal, Quebec, Canada

[22] Filed: Oct. 21, 1970

[21] Appl. No.: 191,260

Related U.S. Application Data

[63] Continuation-in-part of Ser. No. 117,591, Feb. 22, 1971, abandoned.

[52] U.S. Cl. ..........................340/173 AM, 340/172.5

[51] Int. Cl. ..............................................G11c 15/00

[58] Field of Search......340/173 AM, 172.5, 174 GA

[56] References Cited

UNITED STATES PATENTS

| | | | |
|---|---|---|---|
| 3,354,436 | 11/1967 | Winder | 340/173 AM |
| 3,646,528 | 2/1972 | Davies | 340/173 AM |
| 3,648,254 | 3/1972 | Blausoleil | 340/173 AM |

OTHER PUBLICATIONS

IBM Tehcnical Disclosure Bulletin, " Hybrid Associative Memory" by Weinberger, Vol. 11, No. 12, 5/69 p. 1744, 1745.

*Primary Examiner*—Stanley M. Urynowicz, Jr.
*Attorney*—John E. Mowle

[57] ABSTRACT

A rapid associative memory system has simultaneous inputs to many rows of an input matrix of identical subcircuits and also multiple outputs connected to rows of an output matrix of another type of identical subcircuits, for simultaneously producing an output pattern. The matrix subcircuits each contain one or at most two bits of memory. The columns of the two matrices are 1-to-1 linked by circuits for quickly establishing, responding to, or erasing input-output associations. Through control circuits external to the matrix, association of a particular input pattern with a particular output pattern is accomplished by applying the output pattern to the output conductors of the output matrix during the presence of a selected input pattern. The system scans the columns of the matrices for an empty column before placing in the column memory the desired association of input and output patterns. Application of a null pattern to the output conductors during the presence of a selected input erases any previous association of that input pattern with a non-null output. The system is adapted to combine the latter step with writing in a new association for the selected input, in that case obviating the scanning operation. These changes can be made only when the system is switched from an operating to a training condition.

25 Claims, 15 Drawing Figures

INVENTOR
WERNER E. KLUGE
BY John E. Mowle
PATENT AGENT

INVENTOR
WERNER E. KLUGE
BY John E. Mowle
PATENT AGENT

INVENTOR
WERNER E. KLUGE
BY John E. Moule
PATENT AGENT

INVENTOR
WERNER E. KLUGE
BY John E. Moorle
PATENT AGENT

INVENTOR
WERNER E. KLUGE
BY John E. Mowle
PATENT AGENT

INVENTOR
WERNER E. KLUGE
BY John E. Mowle
PATENT AGENT

INVENTOR
WERNER E. KLUGE
BY John E. Hoele
PATENT AGENT

INVENTOR
WERNER E. KLUGE
BY John E. Moule
PATENT AGENT

ADAPTABLE ASSOCIATIVE MEMORY SYSTEM

This application is a continuation-in-part of U.S. application Ser. No. 117,591 filed Feb. 22, 1971 now abandoned and entitled "Adaptable Associative Memory System".

This invention relates to electronic data processing and more particularly to the type of electronic data processing involving associative memories, which uses distributed logic and lends itself well to modular construction and to expansion by addition of modules.

It has long been recognized that data processing memories in the use of which a piece of stored information must be obtained by specifying in the program the location where that particular item is stored, have very considerable disadvantages for many purposes. Much faster retrieval of the stored information can be accomplished, as is known, by organizing memories so that a portion of the information stored can serve as a key to distinguish it from all other information stored and then providing for simultaneous interrogation of the "key" portions of all stored information, in such a fashion that a match of an input signal and with one of the "keys" can at once be made to bring out the rest of that particular stored information. It is common in systems of the latter type to interrogate all memory locations in parallel, but bit by bit: that is, the first bit of all keys, then the second bit, and so on. It is also known to interrogate with a number of bits at once, although this requires multiple input circuits and the development of the search logic in matrix form, with the memory for each key distributed over the cells (subcircuits) of one column of the search matrix and each bit of the input interrogating at once an entire row of matrix cells.

The type of system usable for an associative memory of the kind just described is of course also useful where the input, instead of being part of the stored information, is an item of data identified with the output in question but not necessarily a part of it. Such a system could be used to go from the former telephone number of a subscriber to a newly assigned number, for instance. Systems of this sort are also used for character recognition where the intersection of written lines with a grid or some other superposed pattern might be the input, while the identification of the particular character might be the output.

Many of the devices using the associative memory type of organization heretofore have been special purpose devices (for example information retrieval systems) and those that were not so limited to a special purpose in general have not been easy to program. It is the purpose of this invention to provide a system of this type which can quickly be programmed to recognize any particular input and to associate it with any particular output, with the capability of having a large number of elements in the input or in the output, or both. Likewise, the invention aims to make it possible equally quickly to remove the program for recognizing some particular input or producing some particular output and either replace those provisions with different ones or clearing for future use the particular columns of the input and output matrices.

The data processing system of the present invention is so arranged that when a particular set of input conditions is present on the input side, which it is desired to recognize, and when the desired output response is imposed through the output leads, a single order will set up that particular input-output relation in the memory of the system, using the first empty column of the input and output matrices that is found by a rapid scanning circuit. Another simple procedure enables the response to a particular set of input conditions to be checked and still another to change it or to remove that particular recognition and response from the memory columns involved. This type of system can work with a large number of input bits simultaneously presented and can deliver a large number of predetermined output bits for each recognized input pattern. The number of patterns recognized may also be large, but it will naturally be much smaller than the total number of possible combinations of input conditions that can be presented on the input leads (which is $2^n$ for $n$ inputs).

If one of the patterns to be recognized is specified by the conditions on less than all of the input leads and for this particular recognition the condition of the other input leads is immaterial, in one form of input matrix according to the invention it is necessary to use several columns, one for each alternative set of conditions on all the input leads which may satisfy the particular recognition criteria. The output matrix in that case, of course, will be programmed so that the same response is given no matter which of these alternative set of input conditions should happen to be recognized. If there are more than a few situations where a "don't care" relation exists between a particular input and a pattern desired to be recognized, the number of columns of the input and output matrices required for each recognition function may either drastically limit the number of conditions that can be recognized or require an unnecessarily expensive array of facilities to be used. For that type of situation, therefore, another form of the invention provides an input matrix with two bits of memory per cell which can program any column in a way that will disregard the condition of any input lead which is not necessary to specify the pattern to be recognized.

In the drawings which describe the above-mentioned embodiments of the invention:

Figure 1:
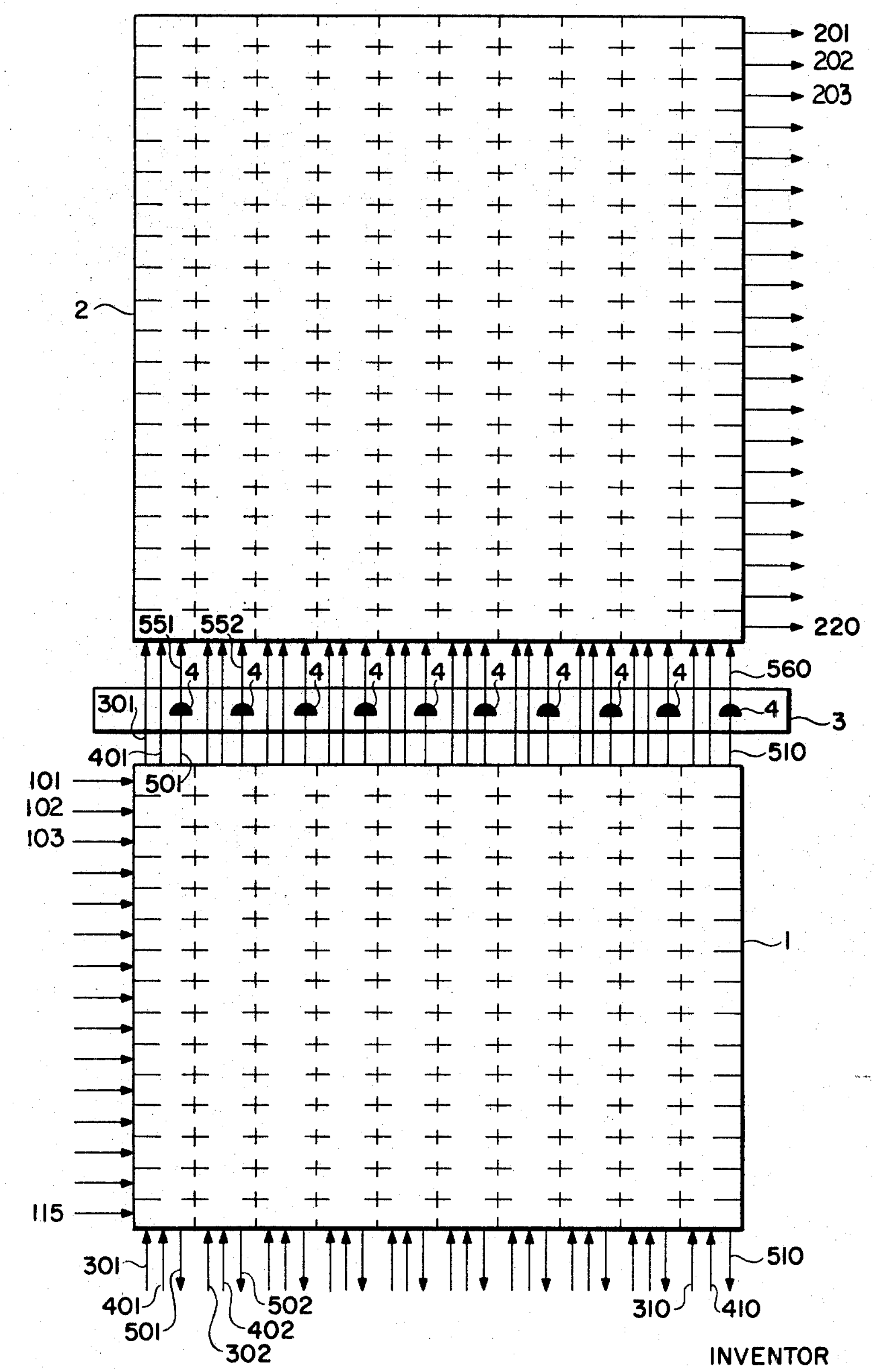
FIG. 1 is a diagram showing the general organization of the input and output matrices of an embodiment of the invention.

FIG. 1 shows the arrangement of input and output matrices 1 and 2 containing distributed logic and memory for a system according to the invention. It is desirable to consider and understand the function of these matrices and their relation to each other before considering the additional units by which they may be quickly programmed to set up, take down or replace any selected relation between a set of input conditions and a set of output conditions that is to become part of the repertory of the system.

Figure 2:
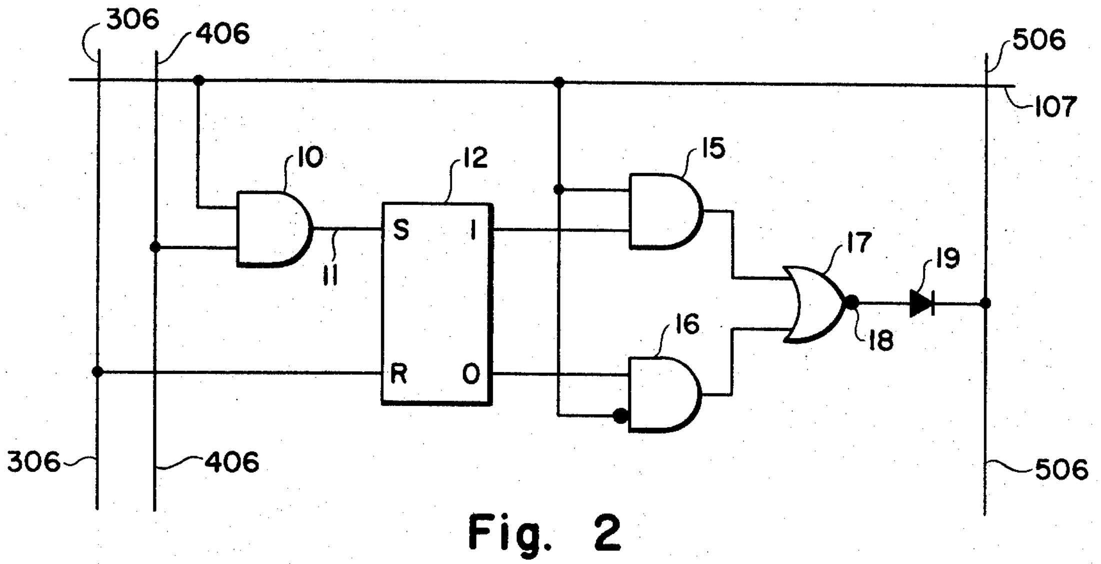
FIG. 2 is a diagram of the electronic logic of each cell of the input matrix of the embodiment of the invention shown in FIG. 1.

The input matrix 1 is shown as a rectangle made up of a large number of small rectangles representing cells of the matrix, these smaller rectangles being defined by a grid of dashed lines. At the left are the input leads 101, 102...115, each one of which communicates with a horizontal row of cells of the matrix 1. Each input lead can have only two significant conditions, either the presence of an electrical signal, also known as the "on-mode", corresponding to the binary digit 1, or the absence of an electrical signal also known as the "off-mode", corresponding to the binary digit "0". Each of the columns of the matrix 1 are connected with three conductors particular to that column. One of these serves the "write" function, another the "erase" function and the third as the column output lead. These appear at the bottom of the diagram. The interconnections of these triplets of leads with the input conductors 101, 102 . . . 115 and with the logic of each cell are shown in FIG. 2, which is a diagram of the electronic logic of a cell of the matrix 1. On FIG. 1 the erase conductors are identified as 301, 302...310. The write conductors are designated 401, 402...410. The output conductors are designated 501, 502...510. The showing of 15 input leads and 10 triplets of column leads corresponding respectively to 15 rows and 10 columns of the matrix 1 is of course illustrative: the matrix can have any number of rows and any number of columns, according to the needs of the work it is to perform, and there will normally be many more rows and many more columns. Since all the cells of a matrix are alike, the circuits lend themselves to manufacture in quantity, not only in the form of one-cell units but also in integrated circuit modules containing from five to 10 rows and five to 10 columns of cells.

The output matrix 2 is also shown in the form of a rectangle subdivided by a grid of dashed lines into a multiplicity of matrix cells. Between the input matrix 1 and the output matrix 2 is located an interface unit 3. If there are many cells in each column of the input and output matrices, which will usually be the case, the interface unit 3 will contain amplifiers (not shown) for the erase and write leads 301, 302...310 and 401, 402...410 that pass through it from each column of the input matrix to the corresponding column of the output matrix. The interface unit 3 also contains an inverting device 4 for each of the output conductors 501, 502...510 of the input matrix, so that when there is an absence of a signal (off-mode) on one of these output conductors, a signal will be furnished (on-mode) to that one of the conductors 551, 552...560 which serves the corresponding column of the output matrix and, likewise, when a signal is present on one of the conductors 501, 502...510 there will be an absence of signal on the corresponding conductor of the set 551, 552...560.

The output conductors 201, 202...220 of the output matrix 2 appear at the right of the diagram. Each of them connects with all the cells in a row of the matrix. The electronic logic and interconnections of each cell of the output matrix 2 are shown in FIG. 3.

Figure 3:
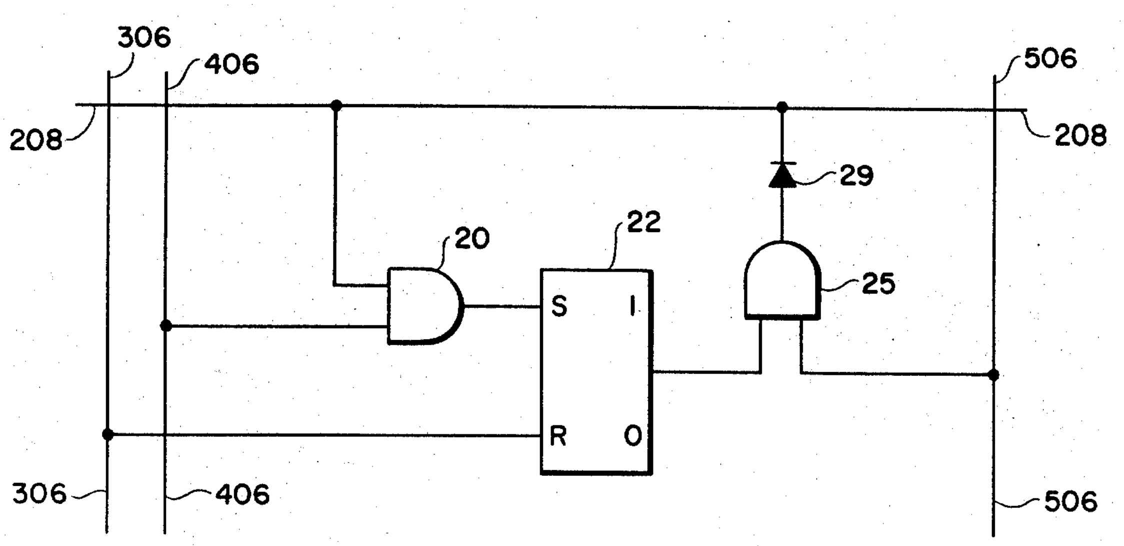
FIG. 3 is a diagram of the electronic logic of each cell of the output matrix of that embodiment.

Although the diagrams of FIG. 2 and FIG. 3 apply to each and every cell of the input and output matrices respectively, for purposes of specific illustration the column and row conductors have been numbered as for a particular cell of the matrix, in the case of FIG. 2 the cell of row 7 and column 6 of input matrix 1 and in the case of FIG. 3 the cell of row 8 and column 6 of output matrix 2.

If there were a column available for every possible combination of input conditions, which would be prohibitively costly for more than a small number of inputs, the logic of each cell of the matrix could be fixed and there would be no need to have any variable memory unit in any cell. In the present system, however, there are much fewer columns in the matrices than there are possible sets of input conditions and the columns are accordingly made up of programmable cells so that any one of the matrix columns can be set to detect any particular combination of input conditions. The "program" in this case is one stored in the very cells to which they relate by simple procedures described below so that "programming" in this sense has none of the connotations associated with computer "software"

The electronic logic of each cell of the input matrix is shown in FIG. 2, which shows the cell for the input conductor 107 and the output conductor 506. Erase conductor 306 and write conductor 406 also make connection with the logic of this cell.

The two inputs of AND gate 10 are connected to input conductor 107 and write conductor 406. Consequently, when both these conductors are simultaneously energized (on-mode), the output lead 11 of gate 10 will set the flip flop 12 so that it continuously provides an on-mode signal to gate 15, whereas gate 16 will receive an off-mode signal from the inverse output terminal of flip flop 12. From a logic point of view, this operation amounts to storing the binary digit 1 in the 1-bit memory constituted by flip flop 12. Flip flop 12 will remain in that condition even after the activation of write conductor 406 ceases and it will remain so until the activation of erase conductor 306 resets flip flop 12 to the inverse condition, which corresponds to storing the binary digit 0 (furnishing an off-mode condition to gate 15 and an on-mode condition to gate 16). During the time flip flop 12 stores a binary digit 1, an on-signal on input conductor 107 will cause the AND gate 15 to supply an on-mode signal to the OR gate 17. The latter has signal inverting means, indicated by the black dot 18, associated with the gate output so that whenever an on-mode signal is furnished to either of the inputs of gate 17, the output of this gate is off-mode rather than on-mode. When neither of the inputs of OR gate 17 is on-mode, the inverted output is on-mode.

Gate 16 is an AND gate with an inversion of the input which is connected to conductor 107, so that when there is a signal on conductor 107 there is none at that input of the gate and vice versa. The other input of gate 16 is to the inverse output of memory flip flop 12. In the conditions just supposed in connection with gate 16, which is to say when there is a signal on conductor 107 and the digit 1 is stored in the flip flop 12, the output of gate 16 will be off-mode and will not contribute to turning off the inverted output of gate 17.

If we consider now the situation when the memory flip flop 12 as before stores the digit 1, but when there is an absence of signal on conductor 107 (off-mode), the output of gate 15 will be off-mode because of the state of conductor 107. The output of gate 16 will then also be off-mode, because of the off-mode signal from the inverse output of the memory. Consequently, the output of OR gate 17 will be on-mode (taking account of the above described built-in output inversion).

On the other hand, if a zero is stored in flip flop 12, such as would be the case after it is reset by means of a signal on erase conductor 306, then flip flop 12 will provide an off-mode signal to gate 15 and an on-mode signal to gate 16. In this case, if there is now an off-mode condition on conductor 107 (absence of signal), this will be provided to gate 16 through its inverting input as an on-mode signal and, together with the on-mode signal now being furnished to gate 16 by flip flop 12, that will cause an on-mode signal to be furnished to gate 17, to which the latter will respond by providing an off-mode output to conductor 506. At the same time, gate 15 will provide an off-mode signal to gate 17. If, however, there should be an on-mode signal on conductor 107, while flip flop 12 is in its reset or zero-store condition, neither gate 15 nor gate 16 will provide an on-mode signal to gate 17, because of the off-mode input to gate 15 from flip flop 12 and because of the off-mode inverted signal to gate 16 resulting from the presence of signal on conductor 107. With neither input to gate 17 being on-mode, the output of gate 17 will be on-mode (in view of the built-in output inversion).

Each of the cells is provided with a protective diode 19 at its output so that if the cell is providing an off-mode signal, an on-mode signal from some other cell will not feed back into it and disturb it.

To summarize, the output of gate 17 as furnished to output conductor 506 will be an on-mode signal unless there is a match between the condition of input conductor 107 and the information bit scored in flip flop 12. If the information bit is a 1, as defined above, and if the signal is present on input conductor 107, there will be such a match and likewise if the information bit in flip flop 12 is a zero, as previously defined, and if at the same time there is an absence of signal on input conductor 107, there will likewise be a match. In both those cases, the inverted output of OR gate 17 will be off-mode.

The reason for the inversion of gate 17 will now be apparent. All the matrix cells of column six of the matrix have their outputs connected to conductor 506. So long as one or more of the matrix cells in column six of the matrix provides an on-mode signal to conductor 506, the system will recognize this as the same kind of on-mode signal, regardless of how many cells may be contributing to it. The only time that conductor 506 will be in an off-mode condition is when the output to conductor 506 from each of the cells in column six of the input matrix is an off-mode condition. That happens only when every one of the inputs to the matrix matches the memory conditions respectively stored in the flip flops of the cells of this column. Since in a binary logic circuit only the presence or absence of a signal and not its magnitude can be recognized, the unique condition of a common conductor connected to receive signals from several other conductors will, of course, be the absence of signal.

Each operation of the output matrix 2 (FIG. 1) is initiated by an activating on-mode signal for a column corresponding to some column of the input matrix at which a match of input and memory has been detected. Consequently, the output conductors 501, 502...510 of input matrix 1 are connected to an array of inverters 4 in the interface unit 3 interposed between the matrices 1 and 2, so that a signal which is the binary inverse of the column output signal of the input matrix 1 can be furnished to the corresponding column of the output matrix 2 through conductors 551, 552...560.

The erase and write conductors of the input matrix 1 can be fed directly from the columns of the input matrix 1 to the corresponding columns of the output 2, but if these matrices have many cells, it will be desirable to provide amplification for the signals on the erase and write conductors as they pass through interface unit 3. Amplifiers are not shown there in FIG. 1, but it will be readily understood how they could be provided.

FIG. 3 shows the electronic logic of each cell of the output matrix 2. In this case, conductors corresponding to columns six and row eight of the matrix are shown, but it will be understood that there is the same arrangement in each of the other cells. The memory pattern for a particular column is written in by imposing the desired output signal pattern on the output conductors 201, 202...220, while at the same time activating the write conductor of the particular column. Thus, with reference to FIG. 3, when write conductor 406 is energized to an on-mode condition and there is also an on-mode signal on output conductor 208, then AND gate 20, having an on-mode signal at both inputs, will furnish an on-mode signal to flip flop 22, which will set it in the condition representing the storage of binary digit 1, which is to say that its normal output will furnish an on-mode signal to gate 25 until flip flop 22 is reset to its 0-storage condition by the application of a signal from erase conductor 306 to the reset terminal of flip flop 22.

If now we consider the situation after both the write signal on conductor 406 and the imposed programming signal on conductor 208 have been removed, then if a signal appears on column conductor 506, the AND gate 25 will furnish an on-mode signal to output conductor 208. If, on the other hand, flip flop 22 had not been set in the condition for storage of digit 1 but had been left in the condition for storage of digit 0, then the presence of a signal on column conductor 506 will not result in any output from gate 25 regardless of the condition of conductor 208, because of the off-mode signal being furnished by flip flop 22 to gate 25 in this case. Therefore, when column conductor 506 is energized, an output pattern will be provided on the output leads 201, 202...220 in which each output lead will be energized which connects to a cell of the column in question in which the digit 1 was stored, in other words, the same output pattern which was used to set the flip flops of that column of the output matrix. This will happen every time the corresponding input matrix column recognizes the programmed input combination.

A diode 29 is interposed in the connection between gate 25 and output conductor 208 so that an output signal furnished by the corresponding gate of another cell of the same row of the matrix will not be fed back into gate 25 when its cell is idle.

The flip flops and gates may be made in various ways well known in the art, preferably with the use of field effect transistors of the metal oxide insulated gate type, which have proved to be relatively economical for flip flop type memories and related circuits. For the gates, transistor logic is preferred, either of the transistor-transistor type (TTL) or the diode transistor type (DTL). Because the memory cells of the matrix are alike, the photographic masks used for the photolithography steps, in making a considerable number of adjoining cells at the same time, are much simpler to make than the corresponding masks for a non-repetitive integrated circuit. Thus a matrix with five to 10 columns and five to 10 rows could be made as an integrated circuit on a single silicon chip. Larger matrices, instead of being made on a single larger chip could be made by assembling modules each containing, for example, five columns and five rows of complete cells.

Figure 4:
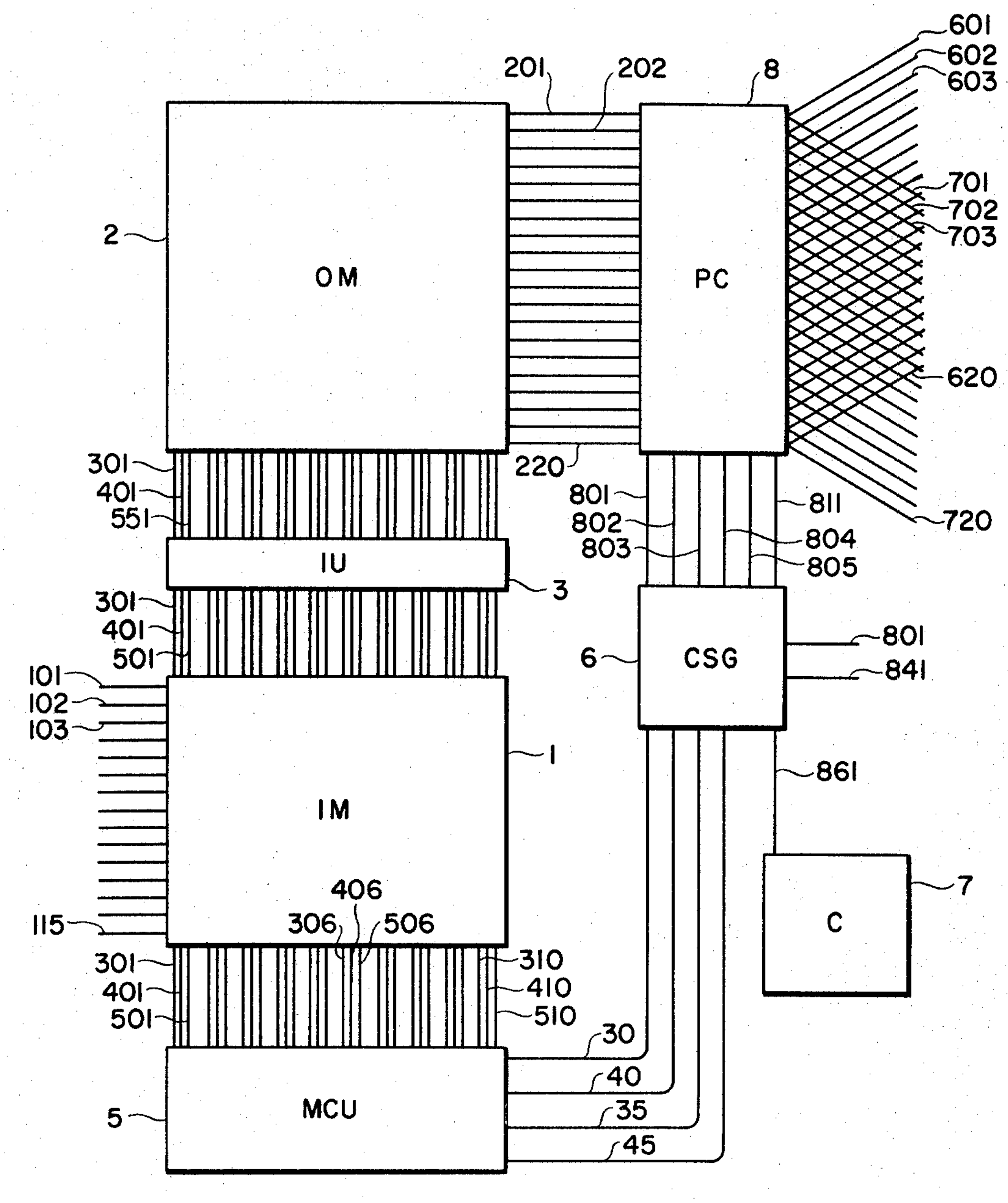
FIG. 4 is a block diagram of a data processing system embodying the invention and incorporating the units shown in FIG. 1.

FIG. 4 shows a data processing system using input and output matrices of the type shown in FIG. 1. In addition to the input matrix 1, the output matrix 2 and the interface unit 3, the system shown in FIG. 4 includes a matrix control unit 5, a control signal generator 6, a timing pulse generator (clock) 7 and an output pattern comparator 8.

The matrix control unit 5 is furnished from time to time with write and erase signals as well as with "clock" pulses by the control signal generator 6.

Another connection between these two units serves to suppress occasionally the transmission of a clock pulse, as described below.

In this description of the system, power supply circuits and controls for putting the system into service or taking it out of service are neglected. It must likewise be understood that systems for surveillance of the performance of the machine could be added without affecting its mode of operation.

The matrix control unit 5 consists almost entirely of a line-up of identical cells, each serving one column of the input and output matrices. It functions to furnish the necessary write and erase signals for individual columns to column conductors 301, 401, 302, 402, 303, 403...310, 410, in response to receiving from control signal generator 6, a write order on conductor 30, or an erase order on conductor 40, as the case may be.

Figure 5:
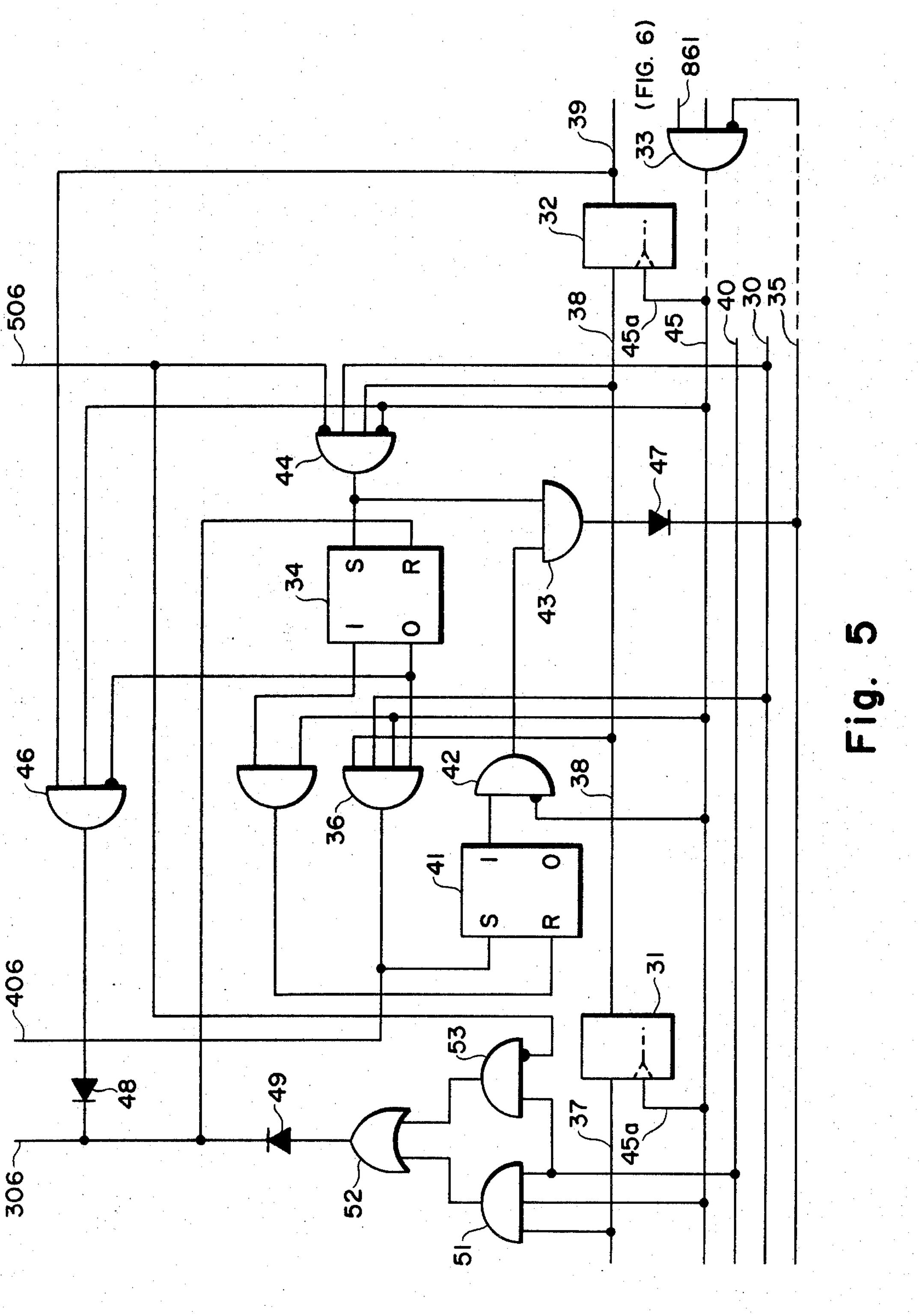
FIG. 5 is a diagram of the electronic logic of one cell of the matrix control unit of the system of FIG. 4.

The electronic logic of one cell of the matrix control unit 5 is shown in FIG. 5. At 31 is shown one cell of a shift register in which one signal bit is shifted in cycles from one column to the next and then on to the end and back to the first, and so on, in response to clock pulses supplied over conductor 45 and conductors 45a, each pulse advancing the signal bit one step of the cycle. The cell next in order of advance is shown at 32. The shift register, of which cells 31 and 32 are shown in FIG. 5 and which has one cell for each column, accordingly, during any particular clock pulse interval, has the binary digit 1 stored in one of its cells and the binary digit 0 in each of the others. It may be regarded as the equivalent of a cyclic series of flip flops, each set in turn by a clock pulse and reset by the next clock pulse. Hence, conductor 37 will be in the on-mode when the preceding cell (not shown, the one serving column 5) of the shift register stores digit 1 and conductor 38 will be in the on-mode when cell 31 of the shift register stores digit 1. Conductor 39 will be in on-mode when cell 32 stores digit 1. At all other times, conductors 37, 38 and 39, respectively, will be in off-mode. The timing of the transfer of binary digit 1 from one cell to the next is the leading edge of a clock pulse and it remains in the same cell until transferred to the next by the leading edge of the next clock pulse received by the shift register.

The conductors 30, 35, 40, 45 connect with elements of all of the cells of matrix control unit 5 in the same way as they connect with the elements of the particular cell shown in FIG. 5. A flip flop 34 serves to store the binary digit 1 while an input-output relation is set up in the column served by this particular cell of the matrix control unit. When the column is empty, flip flop 34 is in the condition of storing binary digit 0.

When a write signal is to be furnished from control signal generator 6 to matrix control unit 5, the desired output pattern must be placed on conductors 201, 202...220 connected to output matrix 2 and the input pattern which is desired to relate to that output pattern must at the same be present on conductors 101, 102...115 connected to input matrix 1. If, at the same time that the write signal is received by the matrix control unit, binary bit 1 of the shift register is in the cell of a column where flip flop 34 also stores binary bit 1, meaning that the column is occupied, nothing will happen during the interval until the next clock pulse. The programming activity of the matrix control unit is thus held off until the shift register bit lands in a cell corresponding to an empty column, which is to say one for which flip flop 34 is in the condition corresponding to binary bit 0. Then a write signal will be provided to the appropriate column conductor, which in the case of FIG. 5 is conductor 406, with the result that during the remainder of the clock pulse duration, the pattern of signals on input conductors 101, 102...115 (FIG. 4) is placed in the memory of the corresponding column of the input matrix, and at the same time the pattern on conductors 201, 202...220 is placed in the memory of the corresponding column of the output matrix 2.

The conditions required for the furnishing of a write signal to conductor 406 are imposed by gate 36, which has an on-mode output only when the inverse (0) output of flip flop 34 is on-mode (which means that flip flop 36 stores a 0), and its input from conductors 30, 38 and 45 are likewise on-mode, meaning that there is a write signal from control signal generator 6, that the ambulatory binary digit 1 is stopping in cell 31 of the shift register and that the clock pulse, the leading edge of which has put the digit 1 in cell 32, is still present. When the clock pulse terminates the output of gate 36 goes off-mode, terminating the write signal on conductor 406.

During that clock pulse, at the same time that the output signal of gate 36 supplies a write signal 406, flip flop 41 is set to store binary digit 1, with the result that as soon as the clock pulse terminates, gate 42 provides an on-mode signal to gate 43 in the interval between clock pulses.

As soon as the input pattern on conductors 101, 102...115 has been stored in column six of input matrix 1, conductor 506 changes to the off-mode condition, a signal which is inverted at its connection to the input of gate 44, so that it appears there as an energizing signal. Conductors 30 and 39, also connected to the input of gate 44, being still on-mode, then as soon as the clock pulse on conductor 45 disappears, gate 44 supplies an on-mode output both to flip flop 34, which it now sets to store binary digit 1 to show that column six is occupied, and also to gate 43, the other input of which was also energized through gate 42 when the clock pulse ceased. Accordingly, gate 43 furnishes an on-mode signal to conductor 35, through protective diode 47, in order to inhibit the transmission of the next clock pulse from conductor 861 through gate 33 in the control signal generator 6 (additionally shown at the right of FIG. 5, connected by dashed lines). This arrangement prevents the same pattern from being adopted by another column by a premature stepping of the shift register. After the input pattern on conductors 101, 102...115 (FIG. 4) which was written into column 6 of input matrix 1 has been removed or changed to another pattern, the off-mode signal on conductor 506 disappears and is replaced by an on-mode signal indicating the absence of a match in that column. This terminates the on-mode output of gate 44 which in turn terminates the on-mode output of gate 43, thus releasing gate 33 through conductor 35 to permit the passage of clock pulses unless some other cell of a matrix control unit has required the clock pulse to be blocked. It will thus be seen that the clock pulse is blocked only for the very short time needed to assure that nothing is falsely written into the memory of some column of the matrices.

It is possible that one circuit element of a column may malfunction so that the column output conductor (506 in FIG. 5) should fail to reach the off-mode condition indicating a successful programming of the column. In this gate 44 will fail to set flip flop 34 and gate 43 will be unable to suppress the next clock pulse. The write operation will then be tried on the next available empty column. In the meanwhile the column in trouble will appear empty, but it will continue to be passed over unless on some subsequent operation the defect fails to appear or proves harmless and an accurate programming is completed. If the trouble, for example, is that a defective flip flop is unable to store digit 1 and continuously stores digit 0, the column is still usable for an input that happens to require the storage of a zero in that particular cell of the column.

A similar check on the output matrix 2 is provided by pattern comparator 8 described below.

If after an unsuccessful attempt to write a pattern into the memory of a column, no off-mode signal is received on the column response conductor (506 in FIG. 5), the column will appear empty because flip flop 34 will not be set, as mentioned above, but a partial storage of the input signal pattern will probably have taken place. This condition if allowed to remain would complicate further attempts to use that column even if the reason for the first failure to complete the write operation should disappear or be immaterial to the next pattern sought to be written there. Gate 46 is therefore provided to erase the column in question on the next clock pulse. While the column is empty it receives erase signals from gate 46 at each cycle of the shift register.

Diodes 48 and 49 prevent mutual interference by the circuits of gates 46 and 52 connected to column erase conductor 306.

Two types of erasure are provided by matrix control unit 5. The first is a general erasure provided by AND gate 51 and OR gate 52 in response to an "erase all" signal given to control signal generator 6 on its conductor 841 (FIG. 6), which causes an erase signal to be furnished to matrix control unit 5 over conductor 40. Gate 51 provides an on-mode output to column erase conductor 306 when there is an erase signal on conductor 40, when the ambulatory binary digit 1 is in the cell preceding cell 31 of the shift register and when a clock pulse is present. Succeeding clock pulses shift the binary digit 1 from one cell of the shift register to the next. The persistence of the erase signal on conductor 40 results in all the relations stored in the various columns being quickly erased by conductors 301, 302...306...310 in turn.

Erasure limited to a particular column can be effected when control signal generator 6 provides an erase signal on conductor 40 but at the same time interrupts the furnishing of clock pulses on conductor 45, as it can do under control of the pattern comparator 8 as explained below. Before such an erase signal is supplied, however, the input pattern stored in the column to be erased must be set up on conductors 101, 102...115 of input matrix 1, to cause a match signal to be transmitted to the appropriate cell of matrix control unit 5. In the case of column six, this is done by an off-mode signal on conductor 506 which is communicated to the inverting input of gate 53 which then produces an on-mode output signal to gate 52 as soon as the erase signal appears on conductor 40, resulting in an erase signal being furnished to conductor 306 by gate 52. During this operation the condition of the shift register is immaterial, for so long as no clock pulses are transmitted during the presence of the erase signal none of the gates corresponding to gate 51 will pass the erase signal to its column.

So long as there is no write signal on conductor 30 and no erase signal on conductor 40, the input and output matrices 1 and 2 are in their operating mode and input matrix 1 can proceed to recognize input patterns supplied to it on conductors 101, 102...115 and cause output matrix 2 to respond by supplying the associated output patterns on its output conductor 201, 202...220.

The pattern comparator 8 (FIG. 4) serves to impose a desired output pattern on conductors 201, 202...220 when output matrix 2 is being programmed by a write signal and also serves to compare an output pattern provided by output matrix 2 on conductors 201, 202...220, during its operating activity, with a desired output pattern, either for the purpose of checking the overall operation or as a preliminary step to reprogramming the output pattern for the particular input pattern in question.

Conductors 601, 602, 603...620 are the output conductors of the pattern comparator. During the operation or execution phase of the system these are the output conductors of the system and communicate the same respective conditions as appear on conductors 201, 202...220 of output matrix 2. Conductors 701, 702, 703...720 are the external input conductors of pattern comparator 8. Programming or checking patterns are supplied to the pattern comparator over these conductors. During programming, the patterns imposed over conductors 701, 702...720 are furnished as outputs of the system over conductors 601, 602...620.

Figure 6:
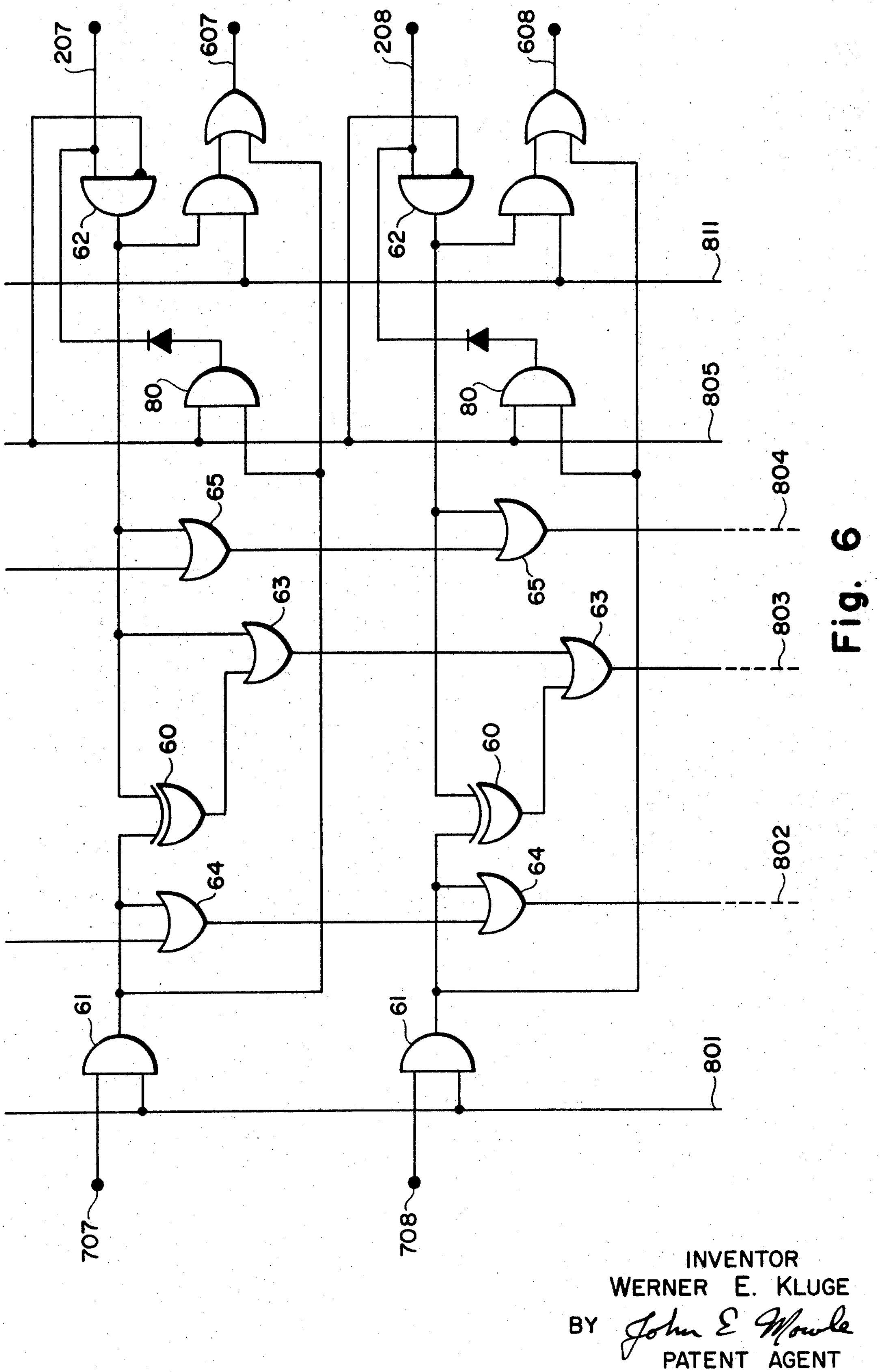
FIG. 6 is a diagram of the electronic logic of two cells of the pattern comparator of the system of FIG. 4.

The pattern comparator 8 is made up of a line-up of cells each of which corresponds to one of the conductors 201, 202...220. Two of these cells, for purposes of illustrating those relating to conductors 207 and 208, are shown in FIG. 6.

The general operation of the pattern comparator is as follows. If the pattern provided by conductors 201, 202...220 corresponds exactly to that provided by conductors 701, 702...720, no action is taken. This prevents waste of memory that would result from setting up the same relation more than once in the matrices. If the pattern provided over conductor 701, 702...720 is the null pattern, that is, that there is an off-mode condition on each of the conductors, while at the same time the pattern on conductors 201, 202...220 is some pattern other than the null pattern, the pattern comparator interprets the situation as requiring the erasure of the memory stored in the flip flops of that column of the input and output matrices. Action is then generated to that effect. Such erasure in a particular column means that the input-output relation which generated the unwanted pattern on conductors 201, 202...220 will no longer produce a "match" signal in any column, in which case the null pattern will be produced at the output. An empty column will produce a "match" when there is a null input pattern, but the corresponding output from output matrix 2 will also be the null pattern.

If a pattern other than the null pattern is provided to pattern comparator over conductors 701, 702...720, and at the same time some other pattern, also not the null pattern, is present on conductors 201, 202...220, the pattern comparator will generate signals to cause, first, the erasure of the relations previously set up in the corresponding column of the input and output matrices 1 and 2 and, then, to establish in that column the new relation linking the input pattern supplied on conductors 101, 102...115 of input matrix 1 with the desired output pattern supplied over conductor 701, 702...720 to the pattern comparator.

All the cells of pattern comparator 8 are connected with conductors 801, 805 and 811, which supply signals from control signal generator 6. Conductors 802, 803 and 804 are outputs supplied to control signal generator 6 respectively, from three chains of OR gates of which each cell of pattern comparator 8 contains one gate of each chain, as described below.

Conductor 801 is in the on-mode for the duration of an external order to put the system in the programming phase (in the case of readily and simply reprogrammable systems like the present one, this may preferably be referred to as the "training" phase and the external order as a "training order"). Conductor 811 is in the condition which is the inverse of that of 801 (i.e., it is in the off-mode during a training order). A suitable switch (not shown) associated with control signal generator 6 may supply the training order to conductor 801. Such a switch could conveniently activate a lock-in circuit (not shown) to hold the training order for one write, erase or erase-and-write operation and then release.

When the training phase is ordered there will normally be an input pattern supplied to input matrix 1 over conductors 101, 102...115 (FIG. 4) either from working data or from a specially supplied input pattern, and there will be an output pattern on conductors 201, 202...220, either the null pattern if the system has not been previously programmed to recognize the particular input, or else some other pattern if some input-output relation was previously set up for that particular input. Each cell of the pattern comparator then compares, by means of the exclusive NOR gate 60, the components of the pattern on conductors 201, 202...220 with the corresponding components of the pattern on conductors 701, 702...720 (in FIG. 6, conductors 207 and 208 on the one hand and conductors 707 and 708 on the other). For ease of presentation of the logic circuit in FIG. 6, conductors 707 and 708 are shown on the left, whereas conductors 207, 208, 607 and 608 are shown at the right rather than preserve the disposition of these arrays of conductors shown in FIG. 4. If the condition of conductors 707 transmitted to gate 60 by gate 61 is the same as that of conductor 207 transmitted to gate 60 by gate 62, the output of gate 60 is off-mode (logic 0) whereas if the compared conditions are different, the output of gate 60 is on-mode (logic 1).

A chain of OR gates 63 collects these determinations from each of the cells of the pattern comparator and furnishes the result to conductor 803, which will accordingly have an on-mode signal if one or more of the cells of the pattern comparator finds a difference between an element of the pattern on conductors 201, 202...220 and the corresponding element of the pattern on conductors 701, 702...720. If there is a complete match, an off-mode signal is provided to conductor 803. Likewise, a chain of OR gates 64 provides an on-mode signal to conductor 802 if one or more of the conductors 701, 702...720 carries an on-mode signal (i.e., if the pattern is one other than the null pattern). Still another chain of OR gates 65 in a similar way provides an on-mode signal to conductor 804 if the pattern on conductors 201, 202...220 is other than the null pattern.

Figure 7:
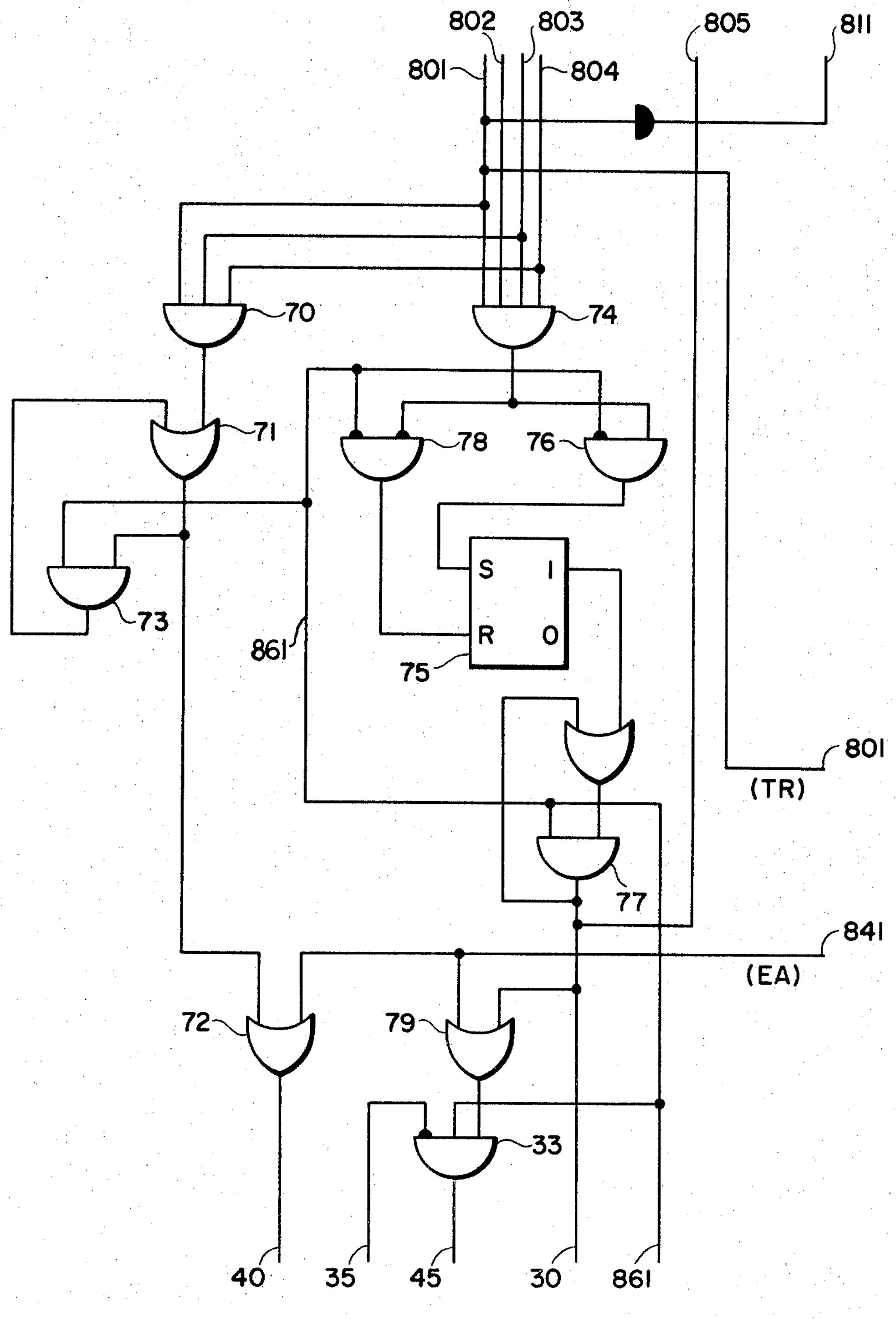
FIG. 7 is a diagram of the electronic logic of the control signal generator of the system of FIG. 4.

FIG. 7 is a diagram of the electronic logic of the control signal generator. As shown there, if during a "-training" phase, when conductor 801 is set in on-mode, there is also an on-mode signal on both conductors 803 and 804, gate 70 will generate an erase signal which is furnished through OR gates 71 and 72 to conductor 40, which leads to matrix control unit 5. This erase signal is held at least for one clock pulse by means of the feedback loop between the gates 71 and 73, the latter being furnished clock pulses from conductor 861 which is connected to the timing pulse generator 7. Gate 33, as mentioned in connection with FIG. 5, will prevent a clock pulse from being transmitted to conductor 45 while one of the flip flops 34 of the matrix control unit is being set. Gate 33 will also keep a clock pulse from being transmitted from conductor 861 to conductor 45 when flip flop 75 is in its reset or zero store position, provided that no "general erase" order is provided on conductor 841. Under the latter conditions the erase signal is supplied only to the particular column in which the input pattern being presented to the input matrix 1 on conductors 101, 102...115 (FIG. 4) is stored. After this erase operation, the on-mode signal on conductor 804 coming from the pattern comparator disappears. If now there is an on-mode signal on conductor 803 and another on conductor 802, meaning that, in the first case, the pattern on conductors 701, 702...720 matches the pattern on conductors 201, 202...220 and, in the second case, that the former pattern is not the null pattern, then in the control signal generator 6 (FIG. 7) gates 74 and 76 set flip flop 75 in its 1-storage position with the trailing edge of the next clock pulse, with the result that gate 77 supplies a write signal to conductor 30 when the following clock pulse appears. Conductor 30 takes the write signal to the matrix control unit 5. The write signal is also provided to conductor 805 which causes the input pattern on conductors 701, 702...720 to be applied on conductors 201, 202...220 by the operation of the gates 80 (FIG. 6). The write signal supplied over conductor 30 to the matrix control unit 5 causes the latter to search for an empty column in the input and output matrices 1 and 2 (as previously described) and establish the desired relation between the input pattern on conductors 101, 102...115 and the output pattern imposed by pattern comparator 8 on conductors 201, 202...220 (FIG. 4) 4) in the first available empty column.

The write signal is removed from the output of gate 77 (FIG. 7) by the termination of each clock pulse, which causes the blocking of gate 80 and the opening of gates 62 in the pattern comparator 8 (FIG. 6), performing a comparison between the pattern on conductors 201, 202...220 and that on conductors 701, 702...720. If a match is found, the on-mode signal on conductor 803 disappears and the off-mode condition of that conductor causes flip flop 75 to be reset into its zero storage condition (FIG. 7) by gate 78. This completes the adoption by the input and output matrices 1 and 2 of the association of the input pattern that was applied to conductors 101, 102...115 and the desired output pattern that was supplied on conductors 701, 702...720. At this time, the training signal must be removed from conductor 801, disconnecting the pattern provided by conductors 701, 702...720 from the pattern comparator circuits by the action of gates 61. That pattern can then be disconnected from conductors 701, 702...720 as soon as convenient, to make those conductors available for another training operation. Likewise, after the training signal is removed, the input pattern on conductors 101, 102...115 with which the completed training operation was concerned will likewise be removed so that other operations can go ahead.

In addition to the working inputs 101, 102...115, and the working outputs 601, 602...620, the only other external signal inputs to the system are, first, the inputs 701, 702...720 for supplying an output pattern to be programmed into the memory of a column of output matrix 2, secondly, control lead 801 for switching the system from working condition to training condition, and finally, control lead 841 for ordering a general erasure of all the memories of cells of the input and output matrices 1 and 2. Signals may conveniently be provided on conductors 801 and 841 by manually operable switches (not shown). If because of the nature of the working input data it is not convenient to use the working input conductors 101, 102...115 directly for specifying input patterns to be stored in the memory of a column of input matrix 1, then a system of gates like the gates 61 of FIG. 6 could be provided so that the input patterns to be programmed into the memory could be switched onto conductors 101, 102...115 when a training signal has been supplied by conductor 801.

So few external signals need to be supplied by external manipulation that the system shown in FIG. 4 lends itself very well to data processing procedures in which it is possible to reprogram the associations between input and output stored in the system as the running of the system on working data may disclose to be desirable, either by the relative frequency that certain patterns turn up or the relevation that it is necessary to scan the raw data for more patterns that might usefully be recognized. Such systems are commonly referred to as adaptable logic systems. The procedure for storing an input-output relation involves merely supplying the desired output pattern when the input pattern with which it is desired to associate it is present at the system input and then manually supplying a "train" signal to conductor 801. The procedure for changing the output pattern to be associated with a previously recognized input pattern is equally simple, as is also the procedure for deleting a previously stored association of an output pattern with a particular input pattern. Furthermore, the pattern comparator 8 and the matrix control unit 5 are, like the input and output matrices, composed of a number of identical cells, with even the shift register of unit 5 susceptible of modular construction, so that these as well as the matrices can be expanded to deal with more columns or more rows in the related matrix by adding cells or modules of, say, five cells. Indeed, since the timing pulse generator 7 could easily serve more than one system, it is necessary to have only a multiplicity of control signal generator units (which are, as shown in FIG. 7, rather small devices) in order to have the choice between operating one large system with very many columns and rows in the matrices or several small systems that could be simultaneously operated.

As previously mentioned, if in the system of FIG. 4 it is desired that a particular pattern on less than all of the input conductors 101, 102...115 should be recognized regardless of the conditions on the remaining input conductors, it would be necessary to tie up several columns of the input and output matrices to present all the possible input combinations of the "don't care" input conductors that might co-exist with the particular input combination of the other conductors which it is desired to recognize. The same output conditions would of course be programmed for each of these columns.

Figure 8:
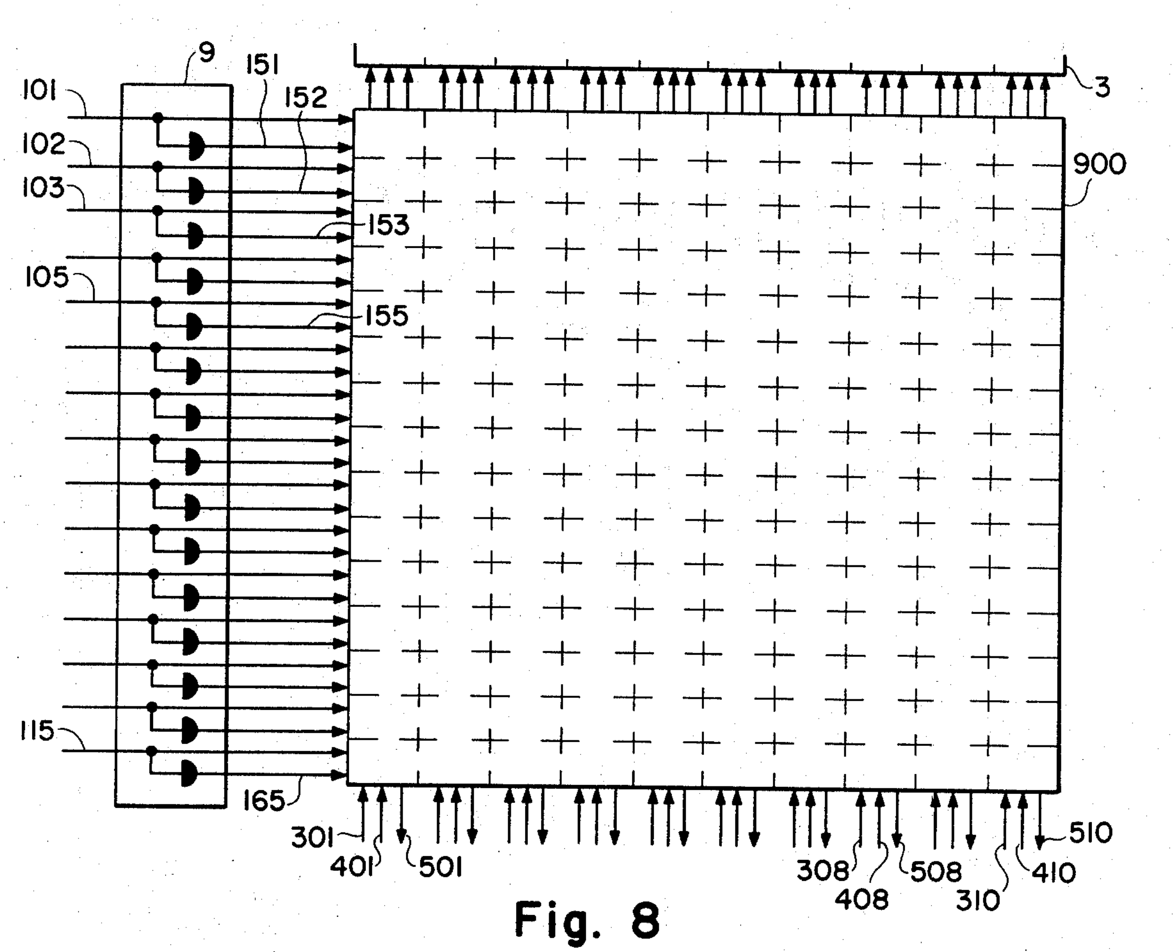
FIG. 8 is a diagram of the input matrix of another embodiment of the invention.
Figure 9:
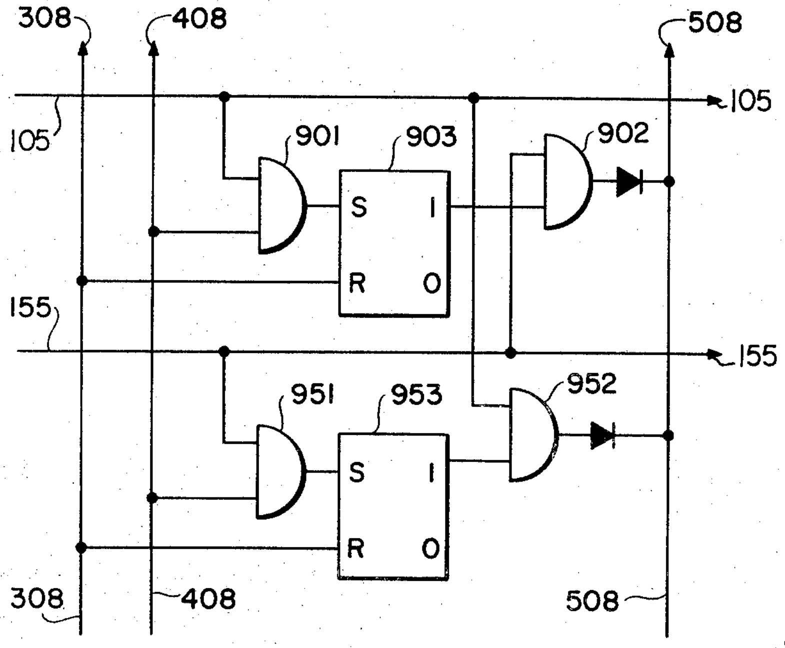
FIG. 9 is a diagram of the electronic logic of one matrix cell of the embodiment of the invention shown in FIG. 8.
Figure 10:
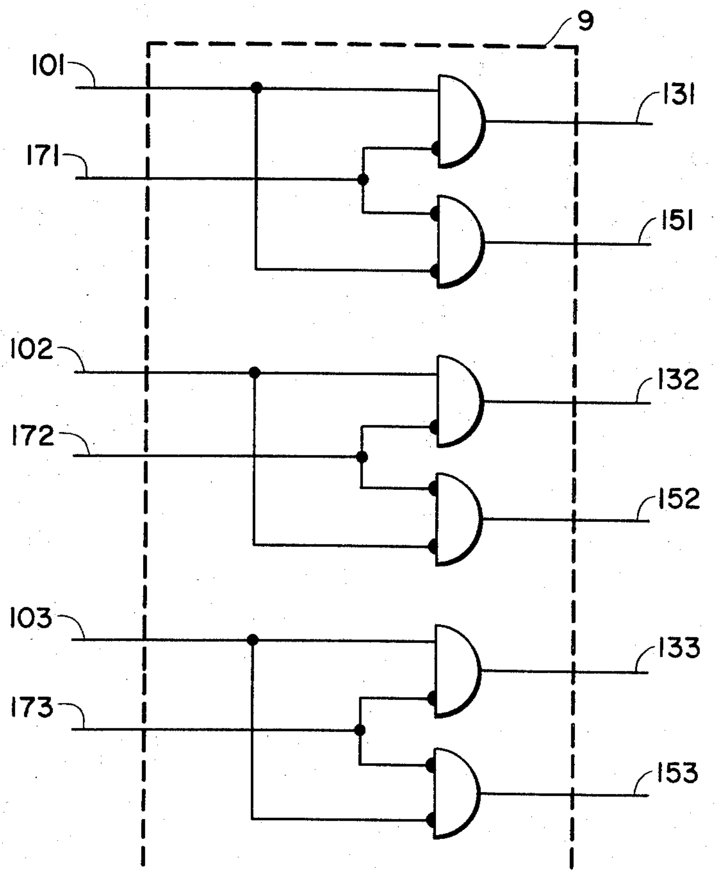
FIG. 10 is a diagram of the electronic logic of a modification of the the circuit array of FIG. 8.

Another type of input matrix is possible which avoids possible excessive use of matrix column facilities in that type of operation, at the cost of supplying an additional one bit memory per cell of the input matrix, plus a simple entrance array through which the various inputs are supplied to the matrix. FIG. 9 shows the electronic logic diagram of one cell of such an input matrix and FIG. 8 shows a matrix of such cells in one useful arrangement. For purposes of illustration the particular cell shown in FIG. 9 is the one associated with input conductor 105 and with column 8 of the matrix shown in FIG. 8. The entrance array 9 shown in FIG. 8 merely derives for each input signal its inverse which is presented to the matrix on an additional input lead. Thus, for the main input leads 101, 102...105, there are corresponding inverse input leads 151, 152...165 which supply an off-mode signal when the corresponding main input is on-mode and vice versa. With this simple type of entrance array, the input matrix 900 shown in FIG. 8 can accomplish all that input matrix 1 can accomplish, but no more. If, however, an input array of the kind of which a part is shown in FIG. 10 is provided to the matrix 900 of FIG. 8, then the presence of an on-mode signal on, for example, conductor 172 will prevent an on-mode signal from being applied to row two of the matrix 900 either by conductor 132 or by conductor 152. An on-mode signal on any other conductor of the group 171, 172...185 would do the same for another row of cells of matrix 900. In other words, a matrix cell programmed by a "don't care" signal for its row will have a 0 stored in both flip flops of the cell, whereas in the absence of a "don't care" signal one and only one of the two flip flops would store a zero when the cell is programmed by a "write" signal for its column. It is obvious that a form of entrance array equivalent to that partially shown in FIG. 10 could be provided in which the off-mode of an extra lead associated with each input bit would result in a zero being stored in both flip flops of the matrix cell of that row which is being programmed. The choice between such an array and the kind shown in FIG. 10 will depend on the form of input desired and the relative expense and reliability of the respective gate systems.

Referring now to FIG. 9 and dealing with the simple entrance array 9 rather than the sophisticated modification shown in FIG. 10, the on-mode or off-mode of conductor 105 provides input "information" to gate 901 in the upper half of the cell and also to one input of gate 952 in the lower half of the cell. Conductor 155 supplies the inverse "information" to gate 951 in the lower half of the cell and to gate 902 in the upper half of the cell. To program the cell to recognize a particular input condition, a write signal must be provided on conductor 408. If at that time there is an on-mode signal on conductor 105, flip flop 903 will be set in a condition that stores the binary digit 1 (which means that it will furnish an on-mode signal to gate 902 and flip flop 953 will remain in its reset condition which stores binary digit zero) which means it will furnish an off-mode signal to gate 952. If on the other hand there was an off-mode condition (no signal) on conductor 105 during the period of the write signal on conductor 408, flip flop 953 would be set to store binary digit 1 and flip flop 903 would remain in its reset condition storing binary digit zero. The expression "remain in its reset condition" is used, because the write signal would not be furnished on conductor 408 unless it had been previously determined that the column was empty, which means that all of the flip flops in the column are in their reset condition as previously reset by an erase signal from conductor 308.

After the completion of the programming operation, the flip flop of the cell in which a zero has been stored will assure that the gate to which its output is connected will deliver an off-mode signal to conductor 508, but the flip flop in which binary digit 1 has been stored will cause the gate to which its output is connected to provide an on-mode signal except when the cell recognizes a match between input and program. For example, if at the time of programming there was an on-mode signal conductor 105, the output of flip flop 903 will be on-mode thereafter until reset. In the meanwhile, therefore, gate 902 will supply an on-mode output to conductor 508 except when an on-mode signal reappears on conductor 105, at which time the corresponding off-mode signal on conductor 155 will block gate 902 and switch its output to off-mode.

The condition of conductor 508, serving the fifth column of matrix cells, will be off-mode only if a match is detected in every cell of that column of the input matrix. When the flip flop in the lower half of the cell stores binary digit 1, the output gate for the upper half of the cell continuously furnishes an off-mode signal and the output gate of the lower half of the cell furnishes an off-mode signal only when there is a match and an on-mode signal the rest of the time. The roles of the upper and lower halves of the cell are reversed when the flip flop in the upper half of the cell stores binary digit 1.

If now an entrance array of the form partially shown in FIG. 10 is substituted for array 9, both flip flops 903 and 953 could store binary digit 0 as the result of a "-don't care" input previously described. In that case both halves of the cell will furnish off-mode signals to conductor 508 through gates 902 and 952 respectively, regardless of the condition of the corresponding input, which is the behavior desired when the cell has received a "don't care" program.

Figure 11:
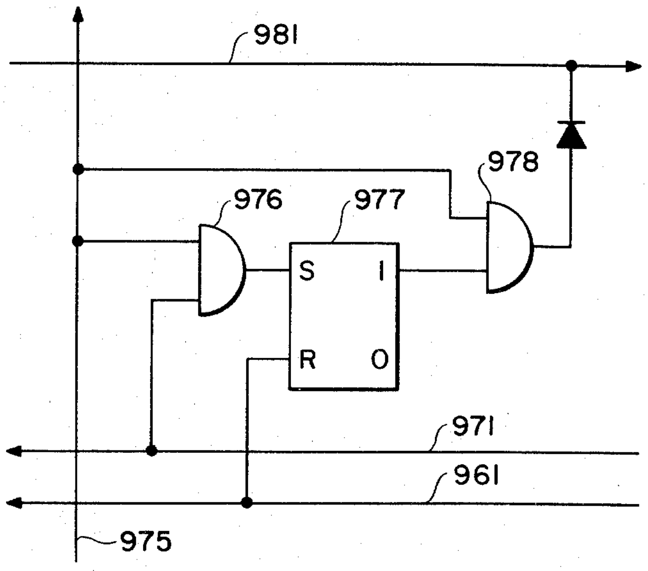
FIG. 11 is a diagram of the electronic logic of one cell of an output matrix of another embodiment of the invention.

FIG. 11 shows a cell of a form of output matrix that is useful where it is desired to produce a signal on a single individual output lead of the system when a particular pattern is identified by the input matrix. In this case, the erase and write conductors, for example, conductors 961 and 971 FIG. 11 are common to a row of the output matrix rather than to a column. They are therefore independent of the write and erase conductors provided for the columns of the input matrix. In an output matrix of which a cell of the former FIG. 11 is a member, there is only one column conductor per column and that is the one that carries the inverse of the output signal of the corresponding column of the input matrix. In the case of FIG. 11 it is conductor 975. When programming corresponding columns of the input matrix an on-mode signal will appear on conductor 975. At the same time an on-mode signal must be provided in write conductor 971 for the row from which the output is required, so that gate 976 will set flip flop 977 to store binary digit 1, thus programming the output matrix. Thereafter whenever the same pattern is recognized by the input matrix, gate 978 will cause an on-mode signal to be produced in the output conductor 981 of this particular row of the output matrix. With this type of arrangement several different input conditions can be programmed to produce the same single output signal, a procedure which may be useful where a very large number of possible input patterns have been classified into a smaller number of categories and it is desired to use the system to compile statistics concerning the relative frequency of input patterns of the various categories. With the type of output matrix which uses cells of the type shown in FIG. 11, input patterns can easily be added or removed from particular output categories or all the connections with a particular output category can be erased using the erase conductor corresponding to conductor 961 of FIG. 11. Because of the relatively simple character of the output signals, the unit which would correspond to pattern comparator 8 in FIG. 4 can be made somewhat simpler, as will be readily understood.

Whenever the desired outputs involve output signals on more than one lead, it is preferable to use an output matrix of the type described in FIGS. 1, 3 and 4, since in that case the writing and erasing in the output matrix should be done by column rather than by row. Of course, in a general sense, the column and row concepts are interchangeable, but for the purpose of this description the convention is observed that the various inputs and the various outputs are connected to matrix rows and that patterns are recognized and generated by operations involving matrix columns. In other words, the series of cells to which an input lead is connected is here called a "row" as is also the series of cells to which an output lead is called, even though it could be represented vertically in a "column" by merely rearranging the diagram. Likewise the series of cells in which a "match" of memory and input can be found and the series of cells activated by a "match" to produce an output pattern are called "columns" even though they could as well be represented horizontally by rearranging the diagrams.

By the use of inverters in various places, equivalents can be provided for the logic circuits here described varying from the latter in form, but not in substance. For example the inverters 4 of the interface unit 3 could be replaced by straight through connections and instead the connection of the column write connectors to the cells of the output matrix 2 (connection of conductor 406 to gate 20 in FIG. 3) could be provided with individual inverters at the gate input. As another example, the ambulatory bit (binary digit) of the shift register of FIG. 5 could be off-mode and the corresponding inputs of gates 36, 44, 46 and 51 could be of the inverting type. An effort has been made to show the logically simplest form of the circuits of systems embodying the invention, but it will be understood that sometimes there may be production reasons for using a less simple equivalent of some part of the system.

If during a training phase a particular non-null output pattern is associated with an input pattern in which all inputs are off-mode, the column in which this association is written will be marked occupied by flip flop 34 (FIG. 5) and this will distinguish it from empty columns. If thereafter in the operation phase such an input appears, both the column just mentioned and also any empty column will respond, but because the output row conductors are effectively OR gates, the null pattern output response of the empty columns will not disturb the presentation of the previously programmed response written in an occupied column for association with an all-off-mode input.

The null output pattern is associated with every input pattern that is not written into any column memory. Indeed, as noted in connection with FIG. 7, the command to associate the null output pattern with a particular input pattern has the effect of erasing a column, if any, into which that particular input pattern may have been written. If there is no such column, no action will be taken, the desired association being in that case already inherently established.

An example of an application of a system of the kind shown in FIG. 4 is a "call diverter" for a large telephone central office serving several office codes. The system would be set up to recognize call numbers for which a diversion order was in force and respond by producing the signals necessary to reroute the call. In such a system, a fast response would be desirable, because it could avoid using the main switching network of the central office twice on each diverted call. Only a small portion of the working telephone numbers served by the central office would be subject to diversion at any particular time and the system could quickly be programmed to set up and take down diversion orders as required. Of course, additional features not shown in FIG. 4 might be needed for such a system, such as a way of checking, before a diversion order is set up, that the new destination is one that accepts or has previously accepted such diversion orders. For those diversion destinations for which a previous acceptance exists, it would be possible to provide a way for the subscriber to dial his diversion order, although as is known, this would require the central office to recognize a particular code for the diversion function.

The portion of such a call diversion system which includes an associative memory according to this invention, for example, a system like that of FIG. 4, could at the same time serve the purpose of an intercept circuit for a telephone central office for referring calls to nonworking numbers or recently changed numbers so quickly to a suitable source of the necessary announcement that much of the equipment used for working calls is never occupied by abortive calls of this character.

An important aspect associated with the described logic system is the detection, location and diagnosis of faults in the input and output matrices illustrated in FIGS. 1 and 8. This can be done by furnishing suitable sets of test patterns to the input conductors 101, 102...115 and control conductors 301, 302...310 and 401, 402...410 of the matrices, and then comparing the response at the respective output conductors 501, 502...510 with reference patterns, which represent the failure-free operation mode. A difference between the reference patterns and the actual output patterns should detect and possibly locate and diagnose the failure.

It is known that for fault tests in iterative cellular arrays the following conditions have to be fulfilled: (1)

each cell must be accessible for a complete test from the input terminals of the array and (2) the results of the cell test must be propagated to at least one of the output terminals of the array.

A complete test of the array can be carried out by consecutively applying the test procedure for a single cell to all cells of the array.

It is known that for fault tests in iterative cellular arrays the following conditions have to be fulfilled (1) each cell must be accessible for a complete test from the input terminals of the array and (2) the results of the cell test must be propagated to at least one of the output terminals of the array.

A complete test of the array can be carried out by consecutively applying the test procedure for a single cell to all cells of the array.

The matrix arrays of the above-described system are sequential, since every cell contains logic and memory (one flip flop). This imposes another requirement - in many applications, it is necessary to reimpose the original state of the overall memory (contents of the flip flops) after completion of the test, while switching the flip flops during the test. Therefore, the test patterns for a cell have to be applied in one out of two different sequences, such that the flip flop undergoes exactly two state transitions. The sequence is determined by the actual contents of the flip flop prior to the test.

In order to meet these requirements for testability, it is necessary to slightly modify the gate structure of the cells (without changing their basic function) and to introduce additional input terminals.

Figure 12:
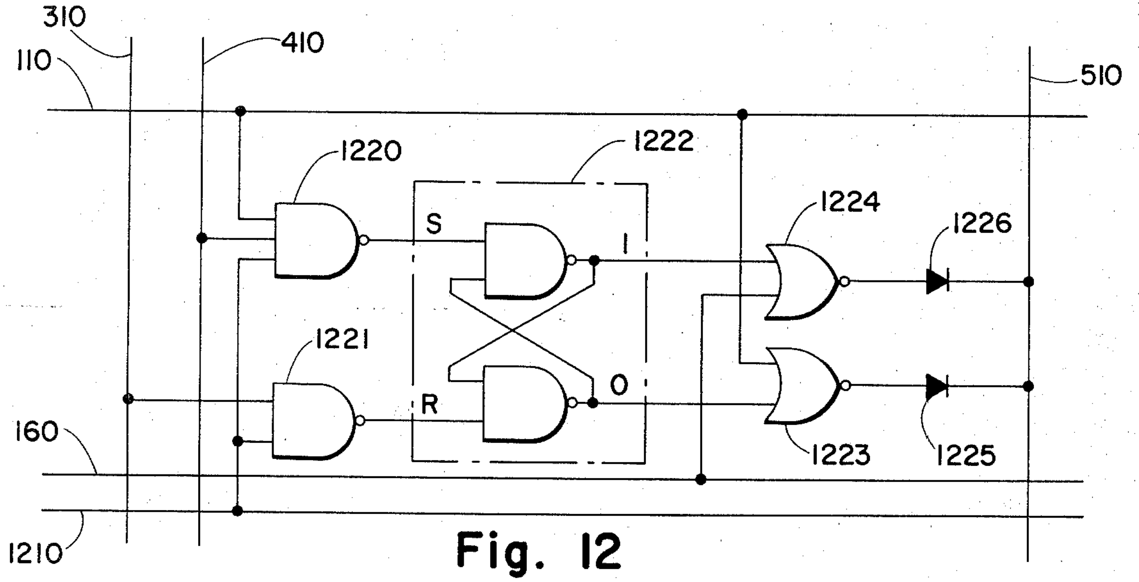
FIG. 12 is a diagram of the electronic logic for a testable cell which may be used in the input matrix of the embodiment of the invention illustrated in FIG. 8.

A testable cell for the input matrix 900 of FIG. 8 is illustrated in FIG. 12 which shows the cell for the input conductor 110, the inverse input conductor 160, the column conductor 510, the erase conductor 310 and the write conductor 410. The conductor 110 carries the inverse signal of conductor 160. In difference to the cell of FIG. 2, additional horizontal control conductors 1201, 1202...1215 have been provided. The conductor 1210 carries a control signal to all cells of row 110, which enables or disables the control signals of the vertical lines 310 and 410 for the cells in row 110. The control conductor 1201, 1202...1215 are in an on-mode for all rows of the array during normal operation. During the test mode only the conductor in that row, where the cell(s) under test is (are) located, carries an on-mode, all other control conductors are in off-mode. Thus, the cell of FIG. 12 when under test is uniquely addressable by the horizontal conductors 110, 160 and 1210, and the vertical conductors 310 and 410.

During normal operation of the cell shown in FIG. 12, on-mode or off-mode signals are applied to the input conductor 110 while inverted signals are simultaneously applied to conductor 160. On-mode signals simultaneously applied to the input conductor 110 and the write conductor 410 result in an off-mode signal at the output of a NAND gate 1220 which is applied to the set input of a RS flip flop 1222. With an off-mode signal present on the erase lead 310, an on-mode signal is coupled from a NAND gate 1221 to the reset input of the flip flop 1222. As a result, the flip flop 1222 assumes a set state resulting in an on-mode signal at its "1" output. The flip flop 1222 can be reset by applying an on-mode signal to the erase lead 310 which results in an off-mode signal at the output of the NAND gate 1221. The RS flip flop 1222 comprises two conventional cross-coupled NAND gates which provide the following truth table:

| S | R | 0 | 1 |
|---|---|---|---|
| ON | OFF | ON | OFF |
| OFF | ON | OFF | ON |
| ON | ON | NO CHANGE | |
| OFF | OFF | NOT ALLOWED | |

With the flip flop 1222 in a set state, on-mode signals from the input conductor 110 and the "1" output of the flip flop 1222 are simultaneously applied to NOR gates 1223 and 1224 respectively, thus resulting in off-mode signals at their outputs which are coupled through diodes 1225 and 1226 to the column conductor 510. The inverse also applies. Thus, when on-mode signals are present on the conductor 160 and the "0" output of the flip flop 1222, an off-mode signal will also be present on column conductor 510. Consequently, whenever the signal on the input conductor 110 matches that from the "1" output of the RS flip flop 1222, on-mode signals will be simultaneously applied to one of the inputs of each of the NOR gates 1223 and 1224 thus resulting in an off-mode signal on conductor 510. Conversely, when the signal on input conductor 110 does not match that on the "1" output of the flip flop 1222, both inputs of either one or the other of the gates 1223 or 1224 will be off-mode signals. Consequently, an on-mode signal will be applied from that particular gate to the column conductor 510. As in previous embodiments, the diodes 1225 and 1226 prevent output signals furnished by the corresponding gates of other cells in the same column from feeding back into the gates 1223 and 1224 when its cell is idle.

In summary, whenever the signal on input conductor 110 matches the information stored in the RS flip flop 1222, an on-mode signal will appear at one input of each the NOR gates 1223 and 1224 resulting in off-mode signals at both their outputs. Hence, column conductor 510 will have an off-mode signal thereon. On the other hand, when the signal on the input conductor 110 does not match that stored in the flip flop 1222, both of the inputs to either one or the other of the NOR gates 1223 or 1224 will be off-mode signals. Consequently, an on-mode signal will appear at the respective output of either the NOR gate 1223 or 1224 resulting in an on-mode signal on the column conductor 510. Thus, the external function of this cell is essentially the same as that described with reference to the cells in FIGS. 2 and 9.

A complete test of the cell consists of the test of the flip flop 1222 in combination with the test of the associated logic. For the test of the RS flip flop 1222, two state transitions have to be executed. In order to retain the original state of the flip flop after completion of the test, either the state sequences 1, 0, 1 or 0, 1, 0 (observed at the "1" output of the flip flop) have to be performed. This permits only a functional test of the flip flop, i.e. the test result contains no information whether the original state was correct. However, it is reasonable to assume that if the flip flop 1222 passes the test successfully it was in the correct state.

Figure 13:
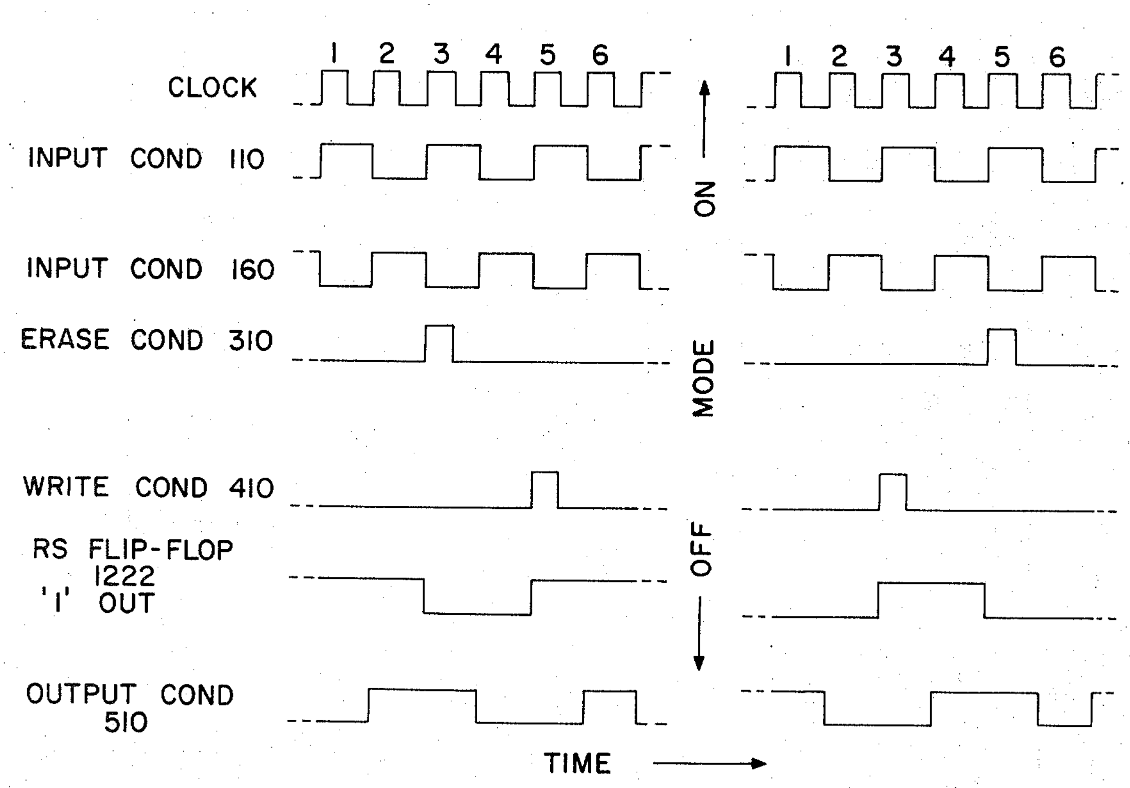
FIG. 13 is a graph illustrating the signals applied to and obtained from the testable cell illustrated in FIG. 12 in order to check the operation thereof.

A test of the cell requires six steps as indicated by the time slots associated with the clock pulses illustrated in FIG. 13. The left hand column indicates the test procedure when the RS flip flop 1222 is initially in the set state whereas the right hand column indicates the test sequence when the RS flip flop 1222 is initially in the reset state.

All cells of one row of the matrix 900, FIG. 8, may be tested simultaneously by independently monitoring the output conductors of each column. This is possible, because the cells are initially independent (no interconnections) and conductor 510 is the only output of the cell. The row under test can be uniquely addressed for the test patterns by applying an on-mode signal to the control conductor of this row, and by applying off-mode signals to the control conductors of all other rows. In order to propagate the test result on the output conductor 510, the output signals of all cells which are not under test have to be kept in off-mode. This can be achieved by furnishing on-mode signals to both the conductors 110 and 160 in all rows, which are not under test. During the test of the cell illustrated in FIG. 12, signals are applied to the input conductor 110, the inverted input conductor 160, the erase conductor 310 and the write conductor 410. The pulse sequence applied to the input conductors 110 and 160 is identical for both test sequences illustrated in FIG. 13. However, the position of the pulses on erase and write conductors 310 and 410 occurring in time slots 3 and 5, reverses depending upon the initial state of the signal on the column conductor 510 which in turn reflects the initial state of the RS flip flop 1222. As explained previously, an on-mode signal as applied continuously to control conductor 1210 during the test sequence.

Assume that the RS flip flop 1222 is initially in the set state as shown in the left hand column of FIG. 13. During clock interval 1 the column conductor 510 will therefore be in an off-mode. The condition of the signal on the conductor 510 is fed to a test signal generator (not shown) which then determines the subsequent series of pulses applied to the cell under test. All of the pulse sequences can be readily obtained from the test signal generator utilizing conventional techniques. During clock interval 1, an on-mode signal is applied to input conductor 110 and hence to NOR gate 1223. Since the flip flop 1222 is in its set state, an on-mode signal as also applied to the NOR gate 1224. This results in two off-mode signals at the outputs of the NOR gates 1223 and 1224 which appear on the conductor 510. During clock interval 2, the input conductor 110 switches to an off-mode. Since the "0" output of the RS flip flop 1222 is also an off-mode signal, this results in an on-mode signal at the output of NOR gate 1223 which appears on the conductor 510. During clock interval 3, an on-mode signal as again applied to NOR gate 1223 from conductor 110. Concurrently, an on-mode signal is applied to erase conductor 310 which results in an off-mode signal at the output of NAND gate 1221 thereby causing the flip flop 1222 to reset. Off-mode signals are now present at both inputs of the NOR gate 1224 so that an on-mode signal remains on the conductor 510. During clock interval 4, an on-mode signal is applied to the input conductor 160 and since the "0" output of the flip flop 1222 is also an on-mode signal, an off-mode signal is coupled to the conductor 510. During clock interval 5, an on-mode signal is again applied to input conductor 110 and also to the write conductor 410 thus resulting in an off-mode signal at the set input of the flip flop 1222, thereby causing it to again set. With on-mode signals present on the conductor 110 and at the "1" output of the flip flop 1222, an off-mode signal continues to appear on the conductor 510. During clock interval 6, the input conductor 110 again reverts to an off-mode signal which matches the signal on the "0" output of the flip flop 1222 thereby again applying an on-mode signal to the conductor 510.

This completes the test sequence for the input cell of FIG. 12. The flip flop 1222 is again in its original (set) state. During each state of the flip flop 1222, both on and off mode signals were applied to the input conductors 110 and 160. Consequently, failure of any of the gates 1220, 1221, 1223, 1224 or the flip flop 1222, would cause an error in the output conductor 510. The correct operation of the cell can thus be readily determined by matching the signal output on the conductor 510 against an identical signal generated by the test signal generator (not shown.

If, initially, the flip flop 1222 is in a reset state, the test sequence applied to the cell is as shown in the right hand column of FIG. 13. The sequence is similar to that shown in the left hand column except that the positions of the write and erase signals applied to the conductors 410 and 310 respectively during clock intervals 3 and 5 are reversed. This causes the flip flop 1222 to first set and then reset to its original state during the test. The output will be as shown on the conductor 510 and again can be readily matched to determine whether there is any failure in the cell under test.

Figure 14:
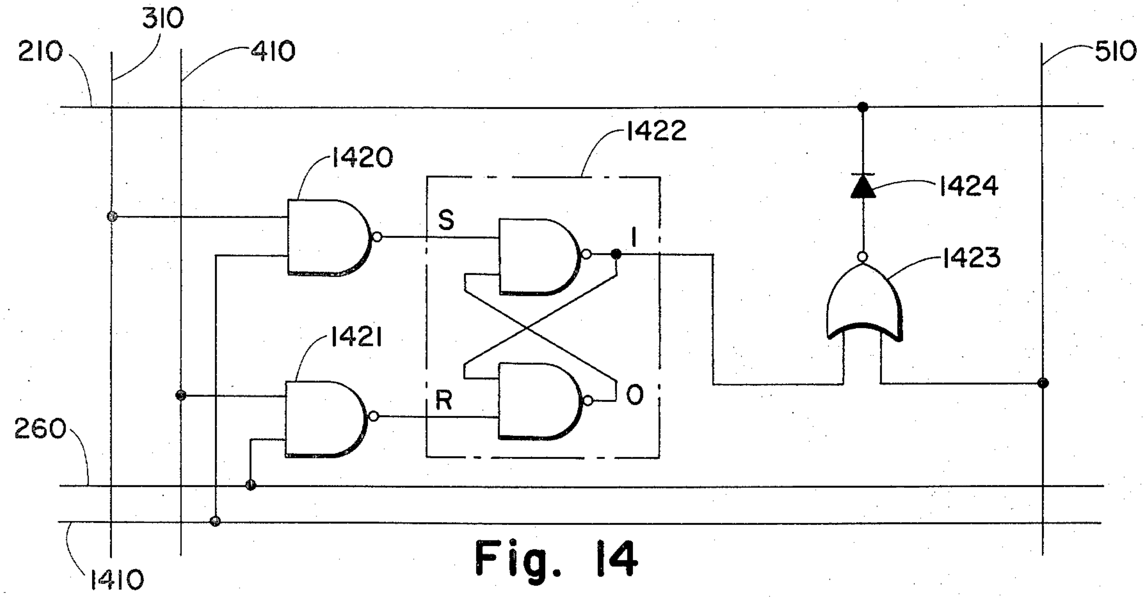
FIG. 14 is a diagram of the electronic logic for a testable cell which may be used in the output matrix of the embodiment of the invention illustrated in FIG. 1.

The electronic logic for a testable cell in the output matrix of FIG. 1 is shown in FIG. 14 which shows the cell for the output conductor 210, the column conductor 510, the erase conductor 310 and the write conductor 410. In order to provide a testable cell two additional conductors are required: a set conductor 260 and a control conductor 1410. The set conductor 260 carries the inverse of the mode, which is to be stored in the cell flip flop 1422 during the programming mode of the system. This signal can be readily obtained from the pattern comparator of FIG. 6 by separating the output of gates 80 from corresponding conductors 207...208 and furnishing it directly to conductor 260 of the output matrix.

It is to be noted that the column conductors 501, 502...510 shown in FIG. 1, are connected directly to the testable output cells of the output matrix without the utilization of inverters 4 shown in FIG. 1. As a result, each of the testable output cells is responsive to inverted signals on the column conductors. All other signals coupled to the testable output cell of FIG. 14 are of the same polarity as those described in the earlier embodiments.

The testable output cell comprises two input NAND gates 1420 and 1421 connected to the respective set and reset inputs of a flip flop 1422. The RS flip flop 1422 is the same as the one illustrated in FIG. 12 and comprises two conventional cross-coupled NAND gates. The "1" output of the RS flip flop 1422 is connected to one input of a NOR gate 1423, the output of which is connected through a diode 1424 to the output conductor 210. A second input to the NOR gate 1423 is obtained from the column conductor 510. As in previous embodiments, the diode 1424 prevents output signals furnished by corresponding gates of other cells in the same row from feeding back into gate 1423 when the cell is idle.

When on-mode signals are simultaneously applied to the set conductor 260 and the write conductor 410, an off-mode signal is applied from the NAND gate 1421 to the reset input of the RS flip flop 1422. This resets the flip flop 1422 so that an off-mode signal appears at the "1" output. If an off-mode signal is also present on the column conductor 510 then an on-mode signal appears on the output of conductor 210. This occurs when the input signals match the information stored in all of the cells connected to the column conductor 510. Whenever an on-mode signal from either the output of the flip flop 1422 or the column conductor 510 is present at the input of the NOR gate 1423, there is an off-mode signal on the output conductor 210.

Figure 15:
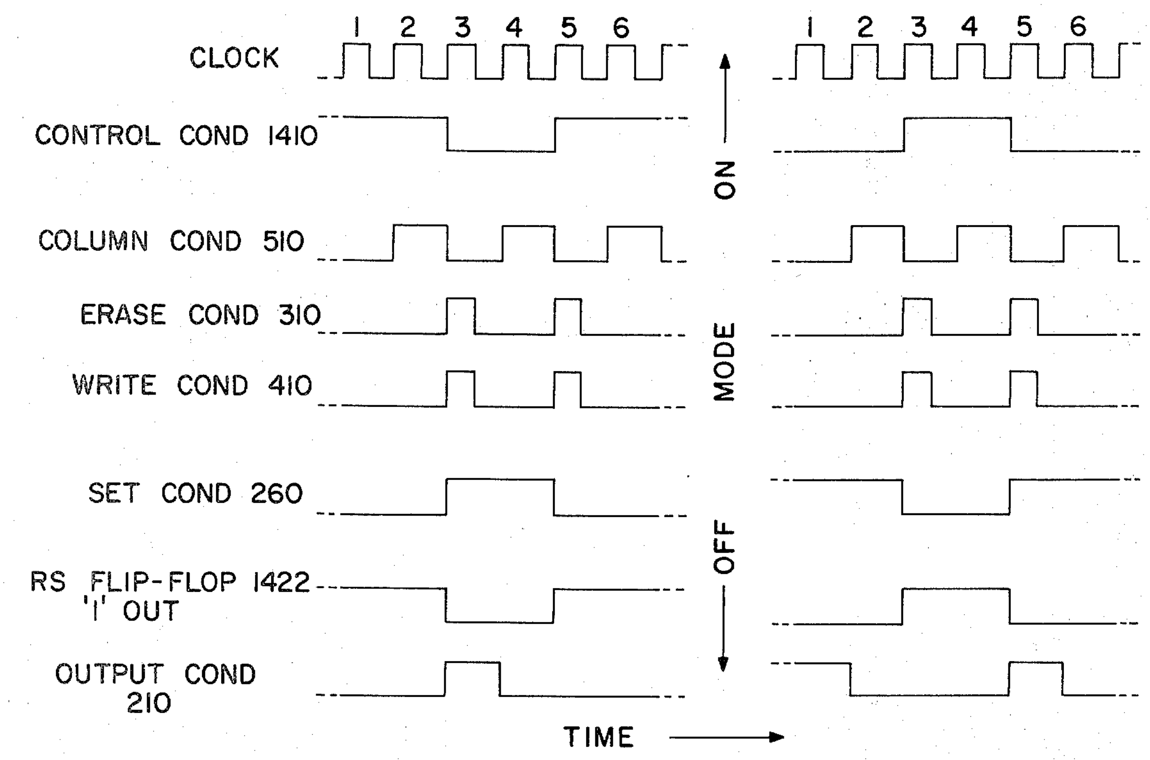
FIG. 15 is a graph of the signals applied to and obtained from the testable cell illustrated in FIG. 14 in order to check the operation thereof.

As in the case of the testable input cell, two different sets of signals are required in order to test the operation of the output cell and return it to its original state. The left hand column of FIG. 15 illustrates the test sequence when the flip flop 1422 is initially in a set condition while the right hand column illustrates the test sequence when the flip flop 1422 is initially in a reset state. The input signals to the column conductor 510, the erase conductor 310 and the write conductor 410 are the same for the two tests. However, the signals to the control conductor 1410 and the set conductor 260 are inverted depending upon the initial state of the flip flop 1422. During the first clock interval, if the output conductor 210 is found to be in an off-mode state it is assumed that the flip flop 1422 is in a set condition. As a result an off-mode signal is initially applied to the set conductor 260 and an on-mode signal initially to the control conductor 1410. With the flip flop 1422 in a set condition, an on-mode signal is applied to the NOR gate 1423 which results in the off-mode signal on the output conductor 210. During the second clock interval, an on-mode signal is applied to the column conductor 510. No other change takes place. During the third clock interval, on-mode signals are simultaneously applied to the erase conductor 310, the write conductor 410 and the set conductor 260 while an off-mode signal is applied to the control conductor 1410. With simultaneous on-mode signals at both inputs of the NAND gate 1421, an off-mode signal is applied to the reset terminal of the flip flop 1422 thereby causing it to change to its reset state. With both off-mode signals applied to the input of the NOR gate 1423, an on-mode signal is coupled through the diode 1424 to the output conductor 210. During the fourth clock interval, the column conductor 510 changes to an on-mode signal thereby resulting in an off-mode signal on the output conductor 210. During the fifth clock interval, on-mode signals are again applied to the erase and write conductor 310 and 410 as well as the control conductor 1410. Off-mode signals are simultaneously applied to the column conductor 510 and the set conductor 260. With on-mode signals at both inputs of the NAND gate 1420, an off-mode signal is applied to the set terminal of the flip flop 1422 thereby causing the flip flop to again set so that an on-mode signal is present at its "1" output. This in turn is applied to the NOR gate 1423 which holds the output conductor 210 in an off-mode state. During the sixth clock interval, an on-mode signal is applied to the column conductor 510. However, no additional change in the operation of the cell takes place.

The flip flop 1422 has passed through both state transitions during which time both on-mode and off-mode signals have been applied to the column conductor 510. If the signal on the output conductor 210 follows that shown in FIG. 15, then it can be assumed that there is proper operation of the testable output cell. Also, if the flip flop 1422 is initially in a reset condition, as detected on the output conductor 210, the sequence of pulses applied in order to fully test the cell are as shown in the right hand column of FIG. 15. The circuitry for monitoring the cells and for generating the test signal voltages can be readily derived using conventional techniques. It is also to be noted that by individually monitoring each of the output conductors from the matrix 2 of FIG. 1, all the cells in any one column can be simultaneously tested.

What is claimed is:

1. An adaptable associative electronic information storage system comprising:

a. an input recognition matrix composed of a multiplicity of electrically identical memory and logic subcircuits containing at least one bit and not more than two bits of memory each and connected in rows and columns;

b. a multiplicity of row input conductors each common to only one row of said subcircuits of said input matrix;

c. an output selection matrix composed of a multiplicity of electrically identical memory and logic subcircuits containing one bit only of memory each and connected in rows and columns;

d. a multiplicity of row output conductors each common to only one row of said subcircuits of said output matrix;

e. a multiplicity of control conductors each of which is common to only one column of said subcircuits of said input matrix and to only one column of said subcircuits of said output matrix, including for every column of said matrices a column write conductor and a column erase conductor;

f. a plurality of column response conductors each common to only one column of said subcircuits of said input matrix;

g. a plurality of column activation conductors each common to only one column of said subcircuits of said output matrix;

h. an array of binary signal inverters each connected to respond to the condition of a column response conductor of said input matrix and to control the operation of a column activation conductor of said output matrix, and i. control means adapted to apply to said row output conductor any of a variety of predetermined output condition patterns, including in said variety a null output pattern, for association with a selected condition pattern of said input conductors and to establish said association in the memories of a column of said input matrix and a related (by said signal inverter array) column of said output matrix by activation of corresponding erase conductors, write conductors or, in sequence, both.

2. An electronic information storage system as defined in claim 1 in which:

j. said subcircuits of said input matrix contain one and only one bit of memory each; and k. said subcircuits of said input matrix contain one and only one bit of memory each.

3. An electronic information storage system as defined in claim 1 in which the memory content of each of said subcircuits, both of said input matrix and of said output matrix, are provided by bistable transistor circuits respectively forming part of said subcircuits.

4. An electronic information storage system as defined in claim 1 in which said control means includes:

l. a timing pulse generator;

m. a shift register adapted to be advanced one step by pulses generated by said timing pulse generator and comprising a cyclically connected array of memory cells, each of which is associated with a column of said input and output matrices and in one of which one binary signal condition exists while in all the others the opposite binary signal condition exists, said shift register being arranged to propagate said unique binary signal condition progressively and cyclically from one of said cells of said shift register to the next; and n. an array of identical circuits, each of which is associated with one cell of said shift register and with the write and erase conductors of a column of said matrices and the response conductor of said column of said input matrix, as well as with common write and erase conductors of said control means, in such a way that application of a predetermined output pattern for association with a selected condition of said inputs different from all conditions (other than the null pattern) at that time in the memory of some column said input matrix, will be prevented from disturbing columns of said input matrix in which such other conditions are in memory and will be effected only in a column in which a null input pattern is in memory.

5. An electronic information storage system as defined in claim 4 in which each of said subcircuits associated with said cells of said shift register contain a one bit memory element adapted to indicate whether the corresponding column is occupied by an association (other than null) imposed by said control means.

6. An electronic information storage system as defined in claim 5 in which each of said subcircuits associated with one of said cells of said shift register also contains an additional one bit memory element adapted to be set by the activation of the corresponding column write conductor, to cause when set the blocking of a timing pulse from said shift register until the pattern, written into the column memory by said energization of said column write conductor, has been removed.

7. An electronic information storage system as defined in claim 1 in each of the said subcircuits of said input matrix of which:

o. there are three AND gates and a one bit memory element adapted (i) to be set by one AND gate having as inputs one of said row input conductors and one of said column write conductors (ii) to be reset by a column erase conductor and (iii) to provide a direct output and an inverse output respectively to the two other AND gates, the first-mentioned of which has for its only other input a connection to said row input conductor and the last-mentioned of which has for its only other input the inverse of the condition of said row input conductor; and p. an OR gate having two inputs, respectively connected to the outputs of said two last-mentioned AND gates, said OR gate having an inverted output connected to one of said column response conductors through a protective diode.

8. An electronic information storage system as defined in claim 1 in which each of said subcircuits of said output matrix contain two two-input AND gates and a one bit memory element adapted (i) to be set by one AND gate having an input connected to one of said column write conductors and its other input connected to one of said row output conductors (ii) to be reset by one of said column erase conductors and (iii) to supply an output when set to the other of said AND gates, which has its other input connected to one of said column activation conductors and its output connected through a protective diode to said one of said row output conductors.

9. An electronic information storage system as defined in claim 1 in which:

q. said multiplicity of row input conductors includes two conductors common to each row of said subcircuits of said input matrix;

r. each pair of row input conductors common to the same row of subcircuits is provided with an entry circuit interconnecting it with a binary signal input conductor and with a "disregard" conductor the condition of which is adapted to indicate whether the subcircuits of a row are intended to disregard the condition of said binary input conductor, said entry means comprising a pair of AND gates both of which have an input activated by one and the same condition of said disregard conductor, one of which gates has another input which responds directly to the condition of said binary input conductor and defines the conductor connected to the gate output as the direct row input conductor and the other of which gates has another input that responds to the inverse of the condition of said binary input conductor and defines the conductor to which the gate output is connected as the inverse row input conductor; and s. each of said subcircuits of said input matrix contains two one bit memory elements, one of which is adapted to be set by one condition of said binary input conductor in the absence of a disregard signal and the other of which is adapted to be set by the other condition of said binary input conductor in the absence of a disregard signal.

10. An electronic information storage system as defined in claim 9 in which:

t. the first-mentioned of said one bit memory elements in each of said subcircuits of said input matrix is associated (i) with an input AND gate by the output of which said memory element is adapted to be set, said input AND gate having inputs connected respectively to a direct row input conductor and a column write conductor and (ii) with an output AND gate with inputs connected respectively to the direct output (on-mode while set) of said first-mentioned memory element and to an inverse row input conductor for the same row served by said row input conductor, said output AND gate having its output connected through a protective diode to a column response conductor; and u. the other of said one bit memory elements in each of said subcircuits of said input matrix is associated with (i) an input AND gate by the output of which said memory element is adapted to be set, said input AND gate having inputs connected respectively to said inverse row input conductor and to said column write conductor and (ii) with an output AND gate with inputs connected respectively to the direct output of said last-mentioned one bit memory element and to said direct row input conductor, said output AND gate having its output connected through a protective diode to said column response conductor.

11. An adaptable associative electronic information storage system comprising:

a. an input recognition matrix composed of a multiplicity of electrically identical memory and logic subcircuits connected in rows and columns;

b. a multiplicity of input conductors each common to only one row of said subcircuits of said input matrix;

c. a multiplicity of control conductors each common to only one column of said subcircuits of said input matrix, including for each column a column write conductor, a column erase conductor and a column response conductor;

d. an output selection matrix composed of a multiplicity of electrically identical memory and logic subcircuits connected in rows and columns;

e. a multiplicity of conductors each common to only one row of said subcircuits of said output matrix including at least an output conductor for each of said rows;

f. a multiplicity of control conductors each common to only one column of said subcircuits of said output matrix including at least a column activation conductor for each of said columns;

g. an array of binary signal inverters each connected to respond to the condition of a column response conductor of said input matrix and to modify the operation of a column activation conductor of said output matrix;

h. a timing pulse generator;

i. system control means, including a switch arranged to command a training phase of the system, adapted during such training phase to impose a selected response pattern on said output conductors for writing into a column activated by its column activation conductor, to generate write or erase signals and to block the output of said timing pulse generator during erase signals so generated, said system control means also including a switch arranged to command generation of an erase signal without blocking of timing pulses; and j. a matrix control unit adapted to receive write and erase signals and timing pulses from said system control means, said matrix control unit comprising a linear array of logic and memory subcircuits and having a shift register adapted to advance a column scanning binary signal cyclically step by step through a series of memory cells each in a different one of said last-mentioned subcircuits in response to said timing pulses, said matrix control unit being so constituted as to be adapted to erase the memory of the column of said input matrix indicated by an off-mode signal of a column response conductor during the presence of an erase signal, to write into the memory of an empty column of said input matrix the signals appearing on the row input conductors thereof during the presence of a write signal, to withhold the writing operation while the said binary signal is in a position in said shift register corresponding to a column which has already been written in and not erased, to mark a column as written in upon receipt of an off-mode binary signal from a column response conductor of said input matrix, to erase a column partially written in upon failure to receive said off-mode signal and to erase memories of all columns in turn when an erase signal and timing pulses are both present.

12. An electronic information storage system as defined in claim 11 in which:

k. said multiplicity of input conductors includes two input conductors common to each row of said subcircuits of said input matrix, of which one is directly connected to a binary signal input of the system and the other is connected to an inverting device so that its condition is the binary inverse of the condition of said binary signal conductors;

l. each of said subcircuits of said input matrix contains two one bit memory elements, one of which is adapted to be set by one condition of a directly connected input conductor of its row and the other of which is adapted to be set by the same condition of the other input conductor of the said row.

13. An adaptable associative electronic information storage system comprising:

a. an input recognition matrix composed of a multiplicity of electrically identical memory and logic subcircuits connected in rows and columns;

b. a multiplicity of row input conductors each common to only one row of said subcircuits of said input matrix;

c. an output selection matrix composed of a multiplicity of electrically identical memory and logic subcircuits connected in rows and columns;

d. a multiplicity of row output conductors each common to only one row of said subcircuits of said output matrix;

e. a multiplicity of control conductors each of which is common to only one column of said subcircuits of said input matrix and to only one column of said subcircuits of said output matrix, including for every column of said matrices a column write conductor and a column erase conductor;

f. a multiplicity of column response conductors each common to only one column of said subcircuits of said input matrix;

g. a multiplicity of column activation conductors each common to only one column of said subcircuits of said output matrix;

h. an array of binary signal inverters each connected to respond to the condition of a column response conductor of said input matrix and to control the operation of a column activation conductor of said output matrix;
i. a timing pulse generator;
j. comparator means adapted for electrically representing a desired output response and for comparing said desired output response with the outputs of said output conductors,
k. system control means, including a switch arranged to command a training phase of the system, adapted during such training phase to generate write or erase signals in response to conditions of said comparator means and to block the output of said timing pulse generator during erase signals so generated, said system control means also including a switch arranged to command generation of an erase signal without blocking of timing pulses, and
l. a matrix control unit adapted to receive write and erase signals and timing pulses from said system control means said matrix control unit comprising a linear array of logic and memory subcircuits and having a shift register adapted to advance a column scanning binary signal cyclically step by step through a series of memory cells each in a different one of said last-mentioned subcircuits in response to said timing pulses, said matrix control unit being so constituted as to be adapted to erase the memory of the column of said input and output matrices indicated by an off-mode signal of a column response conductor in the presence of an erase signal, to write into the memory of an empty column of said matrices the signals appearing on the row input conductors of said input matrix and on the row output conductors of said output matrix during the presence of a write signal, to withhold the writing operation while the said scanning binary signal is in a position in said shift register corresponding to a column which has already been written in and not erased, to mark a column as written in upon receipt of an off-mode binary signal from a column response conductor of said input matrix, to erase a column partially written in upon failure to receive said off-mode signal and to erase memories of all columns in turn when an erase signal and timing pulses are both present.

14. An electronic information storage system as defined in claim 13 in which:
m. said subcircuits of said input matrix contain at least one bit and no more than two bits of memory each, and
n. said subcircuits of said output matrix contain one and only one bit of memory each.

15. An electronic information storage system as defined in claim 14 in which the memory content of each of said subcircuits, both of said input matrix and of said output matrix, are provided by bistable transistor circuits respectively forming part of said subcircuits.

16. An electronic information storage system as defined in claim 15 in which each of said subcircuits of said matrix control unit contain a one bit memory element adapted to indicate whether the corresponding column has been written in and not erased.

17. An electronic information storage system as defined in claim 16 in which each of said subcircuits of said matrix control unit also contains an additional one bit memory element adapted to be set by the activation of the corresponding column write conductor, to cause when set the blocking of a timing pulse from said shift register until the pattern, written into the column memory by said energization of said column write conductor, has been removed.

18. An electronic information storage system as defined in claim 13 in each of the said subcircuits of said input matrix of which:
o. there are three AND gates and a one bit memory element adapted (i) to be set by one AND gate having as inputs one of said row input conductors and one of said column write conductors (ii) to be reset by a column erase conductor and (iii) to provide a direct output and an inverse output respectively to the two other AND gates, the first-mentioned of which has for its only other input a connection of said row input conductor and the last-mentioned of which has for its only other input the inverse of the condition of said row input conductor, and
p. an OR gate having two inputs, respectively connected to the outputs of said two last-mentioned AND gates, said OR gate having an inverted output connected to one of said column response conductors through a protective diode.

19. An electronic information storage system as defined in claim 13 in which each of said subcircuits of said output matrix contain two two-input AND gates and a one bit memory element adapted (i) to be set by one AND gate having an input connected to one of said column write conductors and its other input connected to one of said row output conductors, (ii) to be reset by one of said column erase conductors and (iii) to supply an output when set to the other of said AND gates, which has its other input connected to one of said column activation conductors and its output connected through a protective diode to said one of said row output conductors.

20. An electronic information storage system as defined in claim 13 in which:
q. said multiplicity of input conductors includes two conductors common to each row of said subcircuits of said input matrix;
r. each pair of input conductors common to the same row of subcircuits is provided with an entry circuit interconnecting it with a binary signal input conductor and with a "disregard" conductor the condition of which is adapted to indicate whether the subcircuits of a row are intended to disregard the condition of said binary input conductor, said entry means comprising a pair of AND gates both of which have an input activated by one and the same condition of said disregard conductor, one of which gates has another input which responds directly to the condition of said binary input conductor and defines the conductor connected to the gate output as the direct row input conductor and the other of which gates has another input that responds to the inverse of the condition of said binary input conductor and defines the conductor to which the gate output is connected as the inverse row input conductor, and s. each of said subcircuits of said input matrix contains two one bit memory elements, one of which is adapted to be set by one condition of said binary input conductor in the absence of a disregard signal and the other of which is adapted to be set by the other condition of said binary input conductor in the absence of a disregard signal.

21. An electronic information storage system as defined in claim 20 in which:

t. the first-mentioned of said one bit memory elements in each of said subcircuits of said input matrix is associated (i) with an input AND gate by the output of which said memory element is adapted to be set, said input AND gate having inputs connected respectively to a direct row input conductor and a column write conductor and (ii) with an output AND gate with inputs connected respectively to the direct output (on-mode while set) of said first-mentioned memory element and to an inverse row input conductor for the same row served by said row input conductor, said output AND gate having its output connected through a protective diode to a column response conductor and u. the other of said one bit memory elements in each of said subcircuits of said input matrix is associated with (i) an input AND gate by the output of which said memory element is adapted to be set, said input AND gate having inputs connected respectively to said inverse row input conductor and to said column write conductor and (ii) with an output AND gate with inputs connected respectively to the direct output of said last-mentioned one bit memory elements and to said direct row input conductor, said output AND gate having its output connected through a protective diode to said column response conductor.

22. A system as defined in claim 1 in which each of said subcircuits in the input recognition matrix comprises:

a pair of NOR gates, a one bit memory element and at least one NAND gate;

said one NAND gate being responsive to signals on one of the row input conductors and on one of the column write conductors for setting the memory element in one state, the memory element being responsive to an inverted signal on one of the column erase conductors for setting it in the other state;

one of the NOR gates being responsive to signals from said one of the row input conductors and from the memory element when in said other state; and the other of the NOR gates being responsive to inverted signals from said one of the row input conductors and from the memory element when in said one state, and each of said NOR gates having outputs coupled to one of the column control conductors through separate protective diodes for providing output signals thereto.

23. A system as defined in claim 22 in which the one bit memory element comprises:

a pair of NAND gates each having a pair of inputs and an output, each output of one of said pair of NAND gates being connected to one of the pairs of inputs of the other of said pair of gates.

24. A system as defined in claim 1 in which each of the subcircuits in the output selection matrix comprises:

a NOR gate, a one bit memory element and at least one NAND gate;

said one NAND gate being responsive to signals on a set conductor and on one of the column write conductors for setting the memory element in one state, the memory element being responsive to an inverted signal on one of the column erase conductors for setting it in the other state;

the NOR gate being responsive to a signal from the memory element when in said other state and to a signal from one of the column control conductors; and said NOR gate having an output coupled to one of the output conductors through a protective diode for providing output signals thereto.

25. A system as defined in claim 24 in which the one bit memory element comprises:

a pair of NAND gates each having a pair of inputs and an output, each output of one of said pair of NAND gates being connected to one of the pairs of inputs of the other of said pair of gates.

* * * * *